United States Patent
Amancherla

(10) Patent No.: US 10,453,042 B2
(45) Date of Patent: Oct. 22, 2019

(54) TOKEN USE FOR TRANSACTIONS IN A PAYMENT SYSTEM

(71) Applicant: Quisk, Inc., Sunnyvale, CA (US)

(72) Inventor: Praveen Amancherla, Cupertino, CA (US)

(73) Assignee: Quisk, Inc., Sunnyvale, CA (US)

( * ) Notice: Subject to any disclaimer, the term of this patent is extended or adjusted under 35 U.S.C. 154(b) by 0 days.

(21) Appl. No.: 15/435,874

(22) Filed: Feb. 17, 2017

(65) Prior Publication Data
US 2017/0161701 A1 Jun. 8, 2017

Related U.S. Application Data

(63) Continuation-in-part of application No. 14/938,588, filed on Nov. 11, 2015, now abandoned.

(51) Int. Cl.
| | |
|---|---|
| G06Q 40/00 | (2012.01) |
| G06Q 20/12 | (2012.01) |
| G06Q 20/40 | (2012.01) |
| G06Q 50/34 | (2012.01) |
| G07F 17/32 | (2006.01) |
| G06Q 20/32 | (2012.01) |
| G06Q 20/38 | (2012.01) |

(52) U.S. Cl.
CPC ......... *G06Q 20/123* (2013.01); *G06Q 20/322* (2013.01); *G06Q 20/3821* (2013.01); *G06Q 20/4012* (2013.01); *G06Q 50/34* (2013.01); *G07F 17/3241* (2013.01); *G07F 17/3244* (2013.01)

(58) Field of Classification Search
CPC .................................................... G06Q 40/00
USPC ...................................................... 705/35, 44
See application file for complete search history.

(56) References Cited

U.S. PATENT DOCUMENTS

| | | | |
|---|---|---|---|
| 7,603,555 B2 | 10/2009 | Schmidt et al. | |
| 8,065,695 B1 | 11/2011 | Smith et al. | |
| 8,156,549 B2* | 4/2012 | Rice ........................ | H04L 63/08 726/9 |
| 8,527,361 B2 | 9/2013 | Paleja et al. | |
| 8,898,764 B2 | 11/2014 | Kress et al. | |
| 2009/0328140 A1 | 12/2009 | McPherson et al. | |
| 2012/0124676 A1 | 5/2012 | Griffin et al. | |
| 2012/0166308 A1 | 6/2012 | Ahmed et al. | |

(Continued)

OTHER PUBLICATIONS

Business wire—Industry Leaders Support Check Point's Secure Virtual Network Architecture Phase II to secure eBusiness Applications. Jun. 2000. Retrieved from https://dialog.proquest.com/professional/docview/671345610?accountid=142257 (Year: 2000).*

(Continued)

*Primary Examiner* — Ojo O Oyebisi
(74) *Attorney, Agent, or Firm* — MLO, a professional corp.

(57) ABSTRACT

Disclosed is a method including receiving user credentials from a user device by a server system. The user credentials are authenticated by the server system. A token is transmitted to the user device by the server system. A plurality of transaction requests, each including a transaction amount and the token, are received by the server system from the user device. The server system utilizes the token to determine whether to approve each transaction request until the token expires. These steps are repeated after the token has expired.

18 Claims, 11 Drawing Sheets

(56) References Cited

U.S. PATENT DOCUMENTS

| | | |
|---|---|---|
| 2013/0316703 A1 | 11/2013 | Girard et al. |
| 2014/0006214 A1 | 1/2014 | Paleja et al. |
| 2014/0089202 A1 | 3/2014 | Bond et al. |
| 2014/0213344 A1 | 7/2014 | Rose et al. |
| 2015/0128105 A1 | 5/2015 | Sethi et al. |
| 2015/0186123 A1 | 7/2015 | Piunno |
| 2016/0087933 A1* | 3/2016 | Johnson ............... H04W 4/001 709/245 |

OTHER PUBLICATIONS

Google Developers Online Training, Transmitting Network Data Using Volley, Available at: https://developer.android.com/training/volley/index.html , Accessed on: Nov. 4, 2015.

Office Action dated Aug. 19, 2016 for U.S. Appl. No. 14/938,588.

PayPal Developer Online Documentation, How to Accept Payments in an Android App Using MPL, Available at: https://developer.paypal.com/docs/classic/mobile/ht_mpl-itemPayment-Android/ , Accessed on: Nov. 4, 2015.

PayPal Developer Online Documentation, How to Accept Payments in an iOS App Using MPL, Available at: https://developer.paypal.com/docs/classic/mobile/ht_mpl-itemPayment-i0S/, Accessed on: Nov. 4, 2015.

Youtube Video, S. Vigraham, Android App with PayPal MPL integration, Available at: https://www.youtube.com/watch?v=ZUrJ1YskV70, Accessed on: Nov. 4, 2015.

* cited by examiner

200

300

400

TOKEN USE FOR TRANSACTIONS IN A PAYMENT SYSTEM

CROSS REFERENCE

The application is a continuation-in-part of U.S. patent application Ser. No. 14/938,588 and entitled "Isolated Login Module for Flexible Payment System Interaction," filed Nov. 11, 2015, which is incorporated herein by reference for all purposes.

BACKGROUND

The increasing availability of mobile devices and the commensurate increase in mobile device application offerings are immutable trends in the current economy. Nearly two billion people currently have access to a smartphone, and that number is expected to exceed 2.5 billion within the next three years. Mobile application development is growing at an incredible rate due to the growth of this market and the low barriers to entry associated with the development of an application that can be provided direct to consumers via well-established channels. The increase in mobile application development has also lead to a burgeoning field of tools used to aide ever more people in the development of software. This includes tools for actual code development as well as the provisioning of more liquid channels for sharing and integrating modularized software.

Payment processing is an example of the kind of functionality that has been modularized for inclusion in mobile applications developed by third parties. Payment processors provide application developers with the ability to incorporate payment processing functionality into their applications via published application programming interfaces (APIs) and code blocks that are available for insertion into the developer's source code. For example, FIG. 1 illustrates a mobile device 100 running a mobile application that includes integrated payment processing functionality. The payment processing functionality is integrated in that a user of the mobile application can initiate a payment and conduct a transaction with the provider of the mobile application from within the application itself. As illustrated, a user can interact with the mobile application via a user interface 101 by selecting an item for purchase and identifying a quantity to be purchased. Then, the user can initiate the payment processing functionality by selecting a payment button 102. The button and the functionality that is triggered by the button's selection is implemented using code provided by the payment processor. When the payment is complete, the user continues their experience with the mobile application using code developed by the mobile application developer. This results in a seamless user experience because the user does not need to leave the application in order to conduct their payment transaction.

This may also apply to the online gaming environment for transactions that may be a bet, wager or purchase.

SUMMARY OF THE INVENTION

Disclosed is a method including receiving user credentials from a user device by a server system. The user credentials are authenticated by the server system. A token is transmitted to the user device by the server system. A plurality of transaction requests, each including a transaction amount and the token, are received by the server system from the user device. The server system utilizes the token to determine whether to approve each transaction request until the token expires. These steps are repeated after the token has expired.

The token expires after one or more of a period of time has elapsed, a number of transactions have been performed, a cumulative monetary amount of the plurality of transactions has been reached, or the user device exits the server system. In some embodiments, the period of time is 30 minutes. In other embodiments, the period of time for each token is any suitable amount of time and differs from one another.

The token represents the user credentials and is used in lieu of the user credentials before the token has expired. The user credentials are a user name and a PIN, a password and a PIN, an account number and a PIN, or a finger print. In some embodiments, the transaction is a bet, wager or purchase in a gaming environment.

The method further includes adjusting an account balance by the transaction amount for a user account associated with the user credentials and an account balance by the transaction amount for a merchant account by the server system. The method further includes receiving a balance inquiry and the token from the user device by the server system. The server system validates the token as valid or invalid and the user device displays the balance of a user account associated with the user credentials when the token is valid.

In some embodiments, a second user device is associated with the user credentials and receives a notification in real-time for each transaction. The notification is transmitted by a SMS text, an email or alert, and includes a date, the transaction amount, fees and a transaction ID.

In another embodiment, a method is disclosed and includes receiving user credentials by a second isolated code module. The user credentials are authenticated as approved or declined by the payment system platform sever. The payment system platform sever issues a token in response to the user credentials as approved. The token is valid until a point of expiration. A plurality of bets are received by the application. Each bet has a transaction amount and the token. The payment system platform sever utilizes the token to determine whether to approve each bet until the token expires. An outcome of the bet having the transaction amount is transmitted to the payment system platform sever by the application module. The payment system platform sever adjusts an account balance by the transaction amount for a user account associated with the user credentials and an account balance by the transaction amount for a merchant account. A notification in real-time for each bet is transmitted by the payment system platform sever. The notification is transmitted by a SMS text, an email or alert, and includes a date, the transaction amount, fees and a transaction ID. These steps are repeated after the token has expired.

Before the token has expired, the following steps are repeated: a plurality of bets are received by the application. Each bet has a transaction amount and the token. The payment system platform sever utilizes the token to determine whether to approve each bet until the token expires. An outcome of the bet having the transaction amount is transmitted to the payment system platform sever by the application. The payment system platform sever adjusts an account balance by the transaction amount for a user account associated with the user credentials and an account balance by the transaction amount for a merchant account. A notification in real-time for each bet is transmitted by the payment system platform sever. The notification is transmitted by a SMS text, an email or alert, and includes a date, the transaction amount, fees and a transaction ID.

The token expires after one or more of a period of time has elapsed, a number of bets have been performed, a cumulative monetary amount of the plurality of bets has been reached, or the user device exits the application. In some embodiments, the period of time is 30 minutes. In other embodiments, the period of time for each token is any suitable amount of time and differs from one another.

The token represents the user credentials and is used in lieu of the user credentials before the token has expired. The user credentials are a user name and a PIN, a password and a PIN, an account number and a PIN, or a finger print.

The method further includes receiving a balance inquiry and the token from the user device by the payment system platform sever. The payment system platform sever validates the token as valid or invalid and the user device displays the balance of a user account associated with the user credentials when the token is valid. In some embodiments, a second user device is associated with the user credentials and receives the notification.

In yet another embodiment, a method is disclosed and includes displaying an application interface of an application on a display of a user device using a first isolated code module. An initiation command is received via the application interface. A second isolated code module is invoked using a function call. The function call is conducted by the first isolated code module and conducted in response to the initiation command. A login user interface is displayed on the display of the user device using the second isolated code module. A user credentials is received via the login user interface. A system login API using an API call is invoked. The API call is conducted by the second isolated code module and includes the user credentials. A login response to the API call is received. The login response is received by the first isolated code module and includes a token. The token is valid until a point of expiration. A transaction is conducted in a restricted system API from a set of restricted system APIs using a tokenized API call. The tokenized API call is conducted by the first isolated code module and includes the token. The token is used in lieu of the user credentials for a plurality of transactions until the point of expiration. The first isolated code module and the second isolated code module are stored in a single application space on a single memory on the user device. The first isolated code module and the second isolated code module are isolated in that the second isolated code module cannot be decompiled by a compiler used to compile the first isolated code module.

The point of expiration occurs after one or more of a period of time has elapsed, a number of transactions have been performed, a cumulative monetary amount of the plurality of transactions has been reached, or the user device exits the restricted system API.

DETAILED DESCRIPTION OF THE EMBODIMENTS

Figure 1:
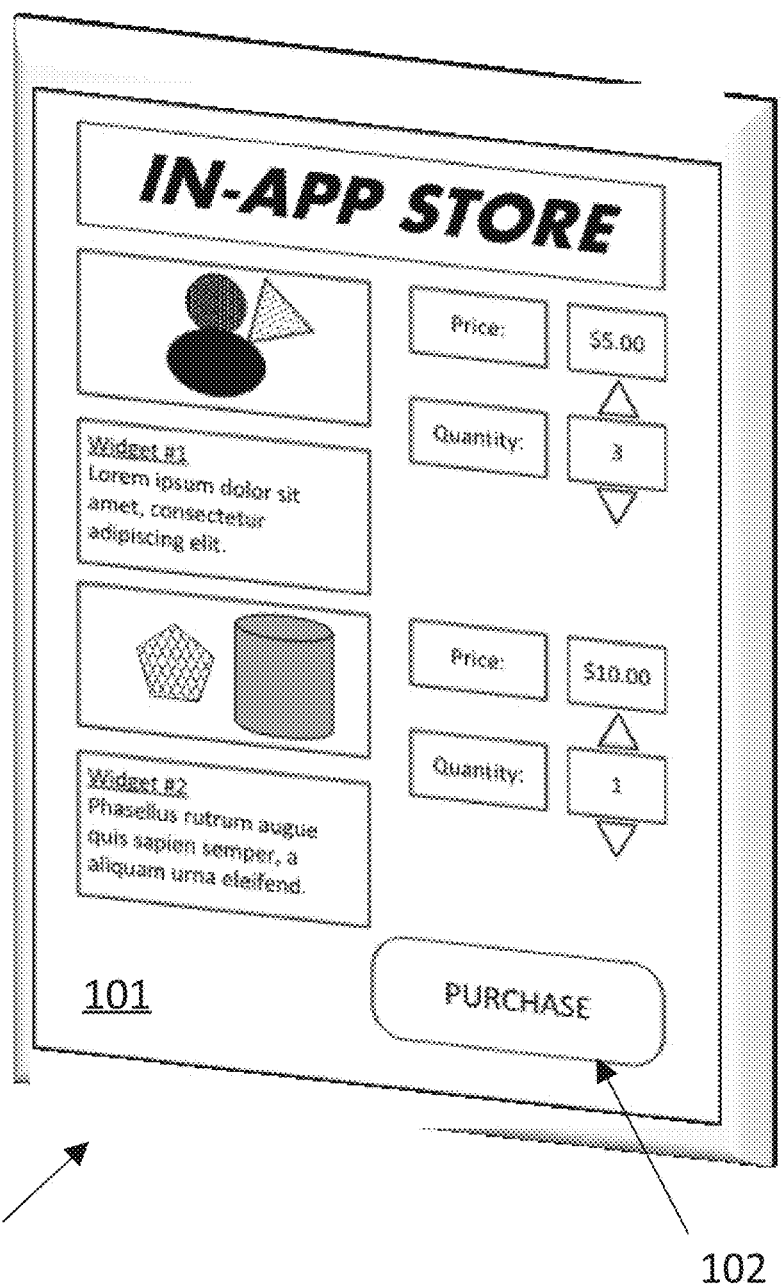
FIG. 1 illustrates a mobile device rendering a mobile application with integrated payments in accordance with the related art.

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the scope thereof. For instance, features illustrated or described as part of one embodiment may be used with another embodiment to yield a still further embodiment. Thus, it is intended that the present subject matter covers all such modifications and variations within the scope of the appended claims and their equivalents.

The following detailed description discloses various approaches for assisting in the development of mobile applications with flexible interaction between a payment system platform developed by a payment system platform developer and the mobile application itself as developed by a mobile application developer. In some embodiments, this may also be implemented by a webpage, web browser or online. Some of the approaches described involve the combination of the core source code for the mobile application, as developed by the mobile application developer, with an obfuscated compiled library file, provided by the payment system platform developer, into a mobile application having payment processing functionality. The segmentation of functionality between these two components of the mobile application provide application developers with a great deal of flexibility in terms of their interaction with the payment system platform while preserving a high degree of isolation to the payment system platform and security to any user credentials that may be needed to initiate a payment with the payment system platform.

The obfuscated compiled library file includes compiled instructions to implement payment processing functionality with the payment system platform. The compiled library file can be in assembly language or machine code and can be obfuscated through known procedures that make the code more difficult to reverse engineer or comprehend. The library file is compiled in that the source code written by the developer of the library file has been translated into a lower level language such as assembly language or machine code using a computer program called a compiler. The developer of the core source code for the mobile application is provided with a description of the payment system platform's APIs. The developer is also provided with the ability to trigger operation of the payment processing functionality and receive a token from the payment system platform using the core source code for the mobile application. The token enables the developer to invoke restricted payment system APIs using the core source code for the mobile application. The token is provided by the payment system platform in exchange for login or payment authorization credentials from a user. However, the entry of those credentials and their delivery to the payment system platform is handled by instructions in the obfuscated compiled library file. As a result, the developer is provided with access to the restricted APIs of the payment system platform and can incorporate said APIs into the core source code of the application, but the manner in which those restricted APIs can be accessed is never distributed by the payment system to the broader public in unprotected form.

The following code snippet is an example of how the obfuscated compiled library file can be integrated with an application that is being developed. In this example, the application is being developed for iOS which is with respect to a mobile application. It may be understood that in other embodiments, this is may be implemented through a webpage, web browser, or online. This is only an example code snippet and is not intended to imply that the improvements described herein are only applicable to a particular programming language, code base, or operating system. In this example, the obfuscated compiled library file will be referred to as the login package library. First the header file of the login package library will be imported in the implementation class where the PaymentSystemLibrary is called. An object of the PaymentSystemLibrary class should be created and the PaymentSystemLibrary class should be added as childviewcontroller to the implementation class. Then the login package class view should be added as a subview of the implementation class's view. The code is as follows:

```
PaymentSystemLibrary * loginPackageVC = [[PaymentSystemLibrary alloc] init];
loginPackageVC.amountString = [NSString stringWithFormat:@"Amount: $%@",enterAmountTextField.text];
[self addChildViewController:loginPackageVC];
loginPackageVC.view.backgroundColor = [UIColor colorWithWhite:0.1 alpha:0.7];
if (UIInterfaceOrientationIsLandscape(self.interfaceOrientation)) {
// Logic for Landscape mode.
} else {
loginPackageVC.view.frame = CGRectMake(0, 0, [[UIScreen mainScreen] bounds].size.width,[[UIScreen mainScreen] bounds].size.height);
}
[self.view addSubview:loginPackageVC.view];
loginPackageVC.view.alpha = 0;
[loginPackageVC didMoveToParentViewController:self];
[UIView animateWithDuration:0.25 delay:0.0 options:
UIViewAnimationOptionCurveLinear animations:^
{
loginPackageVC.view.alpha = 1;
}
completion:nil];
```

The set of restricted payment system APIs can include at least two restricted payment system APIs. The set of restricted payment system APIs are determined by the developer of the payment system and will vary based on what kind of access the developer of the payment system wants to offer application developers. For example, a payment system developer might only want to offer application developers a "get balance" or "balance inquiry" API and "get transaction history" API to allow the application developers to produce applications that let a user check on their accounts, but not actually control the flow of money to or from the user's accounts. The get balance and get transaction history APIs will allow the application developers to build applications that let a user check their balance in the payment system and scan transactions and deposits they have made using the payment system.

Possible restricted payment system APIs that can be accessed using the methods and systems disclosed herein include: a "read and edit profile settings" API which would allow a user to edit their payment system account profile settings using the application, a "make a bet" API which would allow a user to place a bet using the application, a "payment" API which would allow a user to make a payment using the application, a "top up account" API which would allow a user to transfer funds into their payment account using the application, a "send money P2P" API which would allow a user to send money in a peer to peer transaction, a "get money" API which would allow a user to get money from a payment system account using the application, a "bill pay" API which would allow a user to set up a recurring or one-time bill payment using the application, and any other API offered by a payment system. The exact APIs offered will depend upon the payment system characteristics and the set of APIs selected by the payment system developer. For example, a payment system that did not offer a channel for gambling would not have a "make a bet" API, and a payment system that did not include stored funds would not include a "top up account" API.

Throughout this disclosure, a mobile application running on a mobile phone that is integrated with the particular payment system using the approaches described herein will be used as an example. In addition, a payment system in which a user has access to stored funds that are transferred via use of the payment system will also be used as an example throughout this disclosure. However, the improvements described herein apply equally to payment systems used to administrate the transfer of funds or credit from any number of payment sources (e.g., so-called "wallet" payment systems). Also, the improvements described herein apply equally to any application running on any computing device (e.g., an application running on the operating system of a traditional desktop computer or workstation).

As used herein, the term "application developer" will generally refer to the person or entity that is developing the application that will integrate the payment system functionality. Also, the term "payment system platform developer" will generally refer to the person or entity that administrates the payment system and its APIs, administrates the tokens used to access the restricted payment system APIs, and that provides the obfuscated compiled library file to provide application developers with access to the restricted payment system APIs. Finally, the term "user" will generally refer to the person who is using the application developed by the application developer. The user will also generally be an account holder with the payment system that is accessed via credentials issued by the payment system, or a potential account holder that may be signed up with the payment system via their interaction with the application.

Example API Access Procedure

Figure 2:
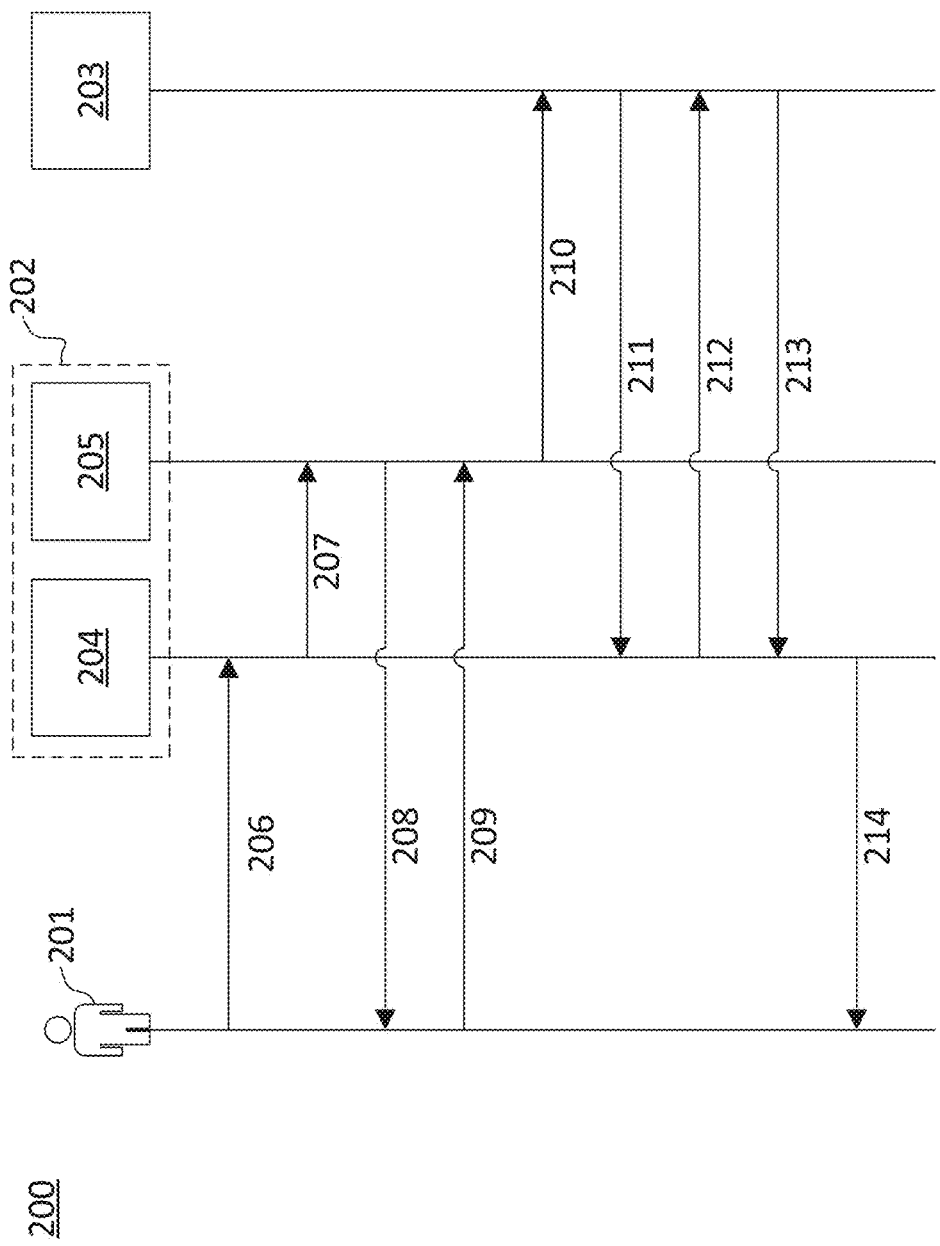
FIG. 2 illustrates a ladder diagram of a process for providing an application with access to a set of restricted payment system APIs that is in accordance with embodiments of the present disclosure.

FIG. 2 illustrates a ladder diagram 200 of a process for providing an application with access to a set of restricted payment system APIs. It some embodiments, this is may be implemented through a webpage, web browser, or online.

The rungs of ladder diagram 200 include a user 201, an application instantiated on a computing device 202, and a server 203. Server 203 could provide access to a payment system platform and be accessible to the computing device via one or more networks. The one or more networks could include the Internet.

Application 202 includes a first isolated code module 204 and a second isolated code module 205. The application can be a machine code program. As used herein, a machine code program is a program that is compiled in the form of instructions that can be executed directly by the central processing unit of a computing device working in combination with memory registers of the computing device. The first and second isolated code modules can be stored in a single application space on a single memory on the mobile device. As used herein the term "application space" refers to a dedicated area in memory into which an operating system loads an application in order to provide the functionality of that application. The first and second code modules may be isolated in that the second isolated code module cannot be decompiled by the compiler used to compile the first isolated code module. Application 202 can be a machine coded program for a computing device. The first isolated code module could be a first portion of the machine code program. The second isolated code module could be a second portion of the machine code program. The first isolated code module could be a compiled human readable coded text file produced by the application developer. For example, the computing device could be a mobile phone and the code modules could be instantiated using a processor of the mobile phone operating on a single application space on the memory of the mobile phone. The second isolated code module could be an obfuscated compiled library file that was compiled with the human readable coded text file as described in the following section.

User 201 could be a user of computing device 202 that is intent on utilizing computing device 202 to access services provided by a restricted set of APIs on server 203 as offered by the application 202. For example, application 202 could be an e-commerce application or a video game instantiated on a mobile phone in which user 201 needs to make a purchase using a payment API provided by server 203. Code modules 204 and 205 could each comprise instructions stored on a non-transitory computer readable medium for the execution of steps associated with each transfer of information among the rungs of ladder diagram 200. Therefore, in certain approaches, this non-transitory computer readable medium will store instructions to conduct a set of processes that are described with reference to FIG. 2 in the following disclosure. The non-transitory computer readable medium could be a single application space in the random access memory or disk of a mobile phone or other computing device.

Data line 206 includes an indication from the user to utilize the payment service offered by a payment system platform. In this example, access to the payment system platform is provided via server 203 and interactions with application 202. The indication could be the selection of a user interface element on a display of computing device 202 to receive a payment initiation command from the user via the application interface. For example, a user could select a "pay" button displayed within the user interface of a mobile game to purchase additional levels or widgets for use within a gaming environment provided. More specifically, the indication could be a payment method selection and initiation command received from the user. For example, a user could select a "credit" radio button from a list of alternative payment methods on offer to make a purchase using a specifically selected payment method.

Data line 206 can also involve displaying an application interface for an application to user 201 via application 202 and an operating system of the computing device on which application 202 is instantiated. The application interface of application 202 could be displayed on a display of a mobile device. In addition, the application interface and associated user interface element could be provided by a first isolated code module 204. In this example, isolated code module 204 could be developed by an application developer such that the developer determines the look and feel of the application interface. This development could take place with the guidance of a payment platform system administrator via the provisioning of code and image files to implement a specific branded user interface element (e.g., a "Pay with Quisk" button). Alternatively, the application developer could select the appearance of the user interface element to suit the overall look and feel of their application. Allowing the application developer to handle the receipt of information along data line 206 therefore provides the application developer with a great degree of flexibility and control over their application even when it comes to initiating a payment using an external payment system.

Data line 207 involves a function call that is used to invoke the second isolated code module 205. The function call is conducted by first isolated code module 204 and is conducted in response to the payment initiation command 206. For example, receipt of selection of the "Pay" button in the prior example by the application 202 could trigger a function call to the second isolated code module 205. In this example, the actual code that encodes the function call will be a part of first isolated code module 204 while the code that executes the function will be a part of the second isolated code module 205. The second isolated code module 205 may be an obfuscated machine coded code module provided by the payment system platform developer and integrated into application 202 by the application developer as explained elsewhere in this disclosure. However, the code used for the function call may also be developed and integrated into application 202 with the guidance of a payment platform system administrator via the provisioning of specific code blocks. The code blocks could be downloaded or copied from a developer portal on a website offered by the payment system. The input to the function call could be a specifically selected payment method type to second code module 205. However, in situations where the payment method selection is a Boolean input indicating receipt of a basic payment initiation command, the function call could also have a null input and simply be used to trigger functionality provided via code module 205.

Data line 208 involves displaying a login user interface to user 201 on the display of a computing device using second isolated code module 205. Data line 209 involves receiving a login credentials from the user via the login user interface. The second isolated code module 205 could work in combination with the operating system of the computing device to build a screen for the display of the computing device that will include inputs to receive login credentials from user 201. The login user interface may include at least one text input box to receive a user name, password, account number, finger print, and/or any other login credential. The credentials are received from the user interface by the second isolated code module 205 such that they are never accessible to first isolated code module 204. As such, a developer of the application can never, even accidentally, expose the user credentials to being obtained via illicit means. Furthermore, since the second isolated code module 205 cannot be decompiled by a compiler that is accessible to the application developer, there is no way that a third party could intentionally decompile second isolated code module 205 and alter its functionality for the purpose of illicitly obtaining the user credentials. Although the application developer will generally need access to the compiler used to compile application 202 in accordance with the teachings herein, the application developer will not need access to the compiler that is used to produce the second isolated code module 205 in the form of an obfuscated compiled library file.

The login user interface can be displayed by application 202 in various ways. In some approaches, the login user interface will be displayed along with portions of the application interface that are provided by first isolated code module 204. The login user interface can be displayed on a first portion of the display of the computing device using second isolated code module 205 while the application interface is simultaneously displayed with the login user interface on a second portion of the display of the computing device using the first isolated code module 204. For example, first isolated code module 204 could provide a video game interface to the display that is at least partially visible on the same screen as the login user interface. The screen could be provided in a reserved portion of the display that was left blank by isolated code module 204 as the application developer complied with instructions provided by the payment system platform developer. Code module 205 could include rules for reformatting the content of the screen used to present the application interface in combination with the operating system of the computing device by, for example, minimizing information provided by the first isolated code module 204 to make room in the gutter, boarder, or header of the display for the login user interface. Alternatively, the login user interface may be overlain above the application display. Any of these techniques could also involve temporarily deemphasizing the content of the display associated with the application in favor of the login user interface. For example, the application display could be darkened, greyed-out, or made translucent, while the login user interface was presented without such modification. As a final example, application 202 could provide a screen to the display that solely consisted of the login user interface while first isolated code module 204 temporarily contributed nothing to the display. Regardless of which of these specific techniques is used, as the login user interface is provided by second isolated code module 205, the user interface will still be presented by application 202 such that there is no need to suspend the application or interrupt it with an alternative application in order to receive login credentials from user 201.

Data line 210 involves invoking a payment system login API offered by server 203 using an API call. The API call is conducted by second isolated code module 205. The API call also includes the login credentials received via data line 209. As a result, the login credentials is passed directly to server 203 without ever being accessible on the computing device except by the second isolated code module 205. Furthermore, second isolated code module 205 can be configured to encrypt the user credentials and never store it in unencrypted form. In this way, the credentials are never accessible on computing device 202 unless second isolated code module 205 is active. The payment system login API can be offered via a developer portal provided by the payment system or it can be distributed with a software development kit (SDK) or developer manual for application developers that are interested in allowing users to make payments in their applications using the payment system.

Data line 211 involves receiving a login response to the API call from server 203. The login response is received by the first isolated code module 204 and includes a token. The token will comprise a quantum of data that can be used by first isolated code module 204 to access a restricted payment system API from a set of restricted payment system APIs offered by the payment system via server 203. The token can be a string of characters broken into different frames or a single uniform string of characters.

Data line 212 involves invoking a restricted payment system API from the set of restricted payment system APIs using a tokenized API call. The tokenized API call is conducted by first isolated code module 204. The tokenized API call also includes the token. Server 203 will receive and validate the token and will restrict access to the restricted payment system APIs unless the token is valid. Upon receipt of the token from data line 211 by server 203, first isolated code module 204 will be able to access the restricted payment system APIs directly without having to interact with second code module 205. Therefore, the token can be used by the application developer when they are coding the first isolated code module 204 with minimal coordination required between the application developer and the payment system developer. All the application developer will need to know is the format used to call and interact with the restricted payment system APIs which is a fairly manageable coordination task. By providing the token to first isolated code module 204 the application developer is provided with greater flexibility to more tightly integrate the payment system with their application. For example, since the first isolated code module 204 is able to make the restricted API call associated with data line 212 it can deliver information that might otherwise have been difficult to pass to isolated code module 205 to the payment system. Using a "purchase" API call as an example, the tokenized API call associated with data line 212 can include a transaction amount for a payment transaction that does not need to be provided to second isolated code module 205 which decreases the coordination costs between the application developer and payment system developer.

The token may be a limited use token. In other words, the token is restricted in the number of times or the duration for which it can be used as administrated by the system that issued the token or the system that redeems the token for information or authorization. For example, the token may be limited to a single use, be limited to a set number of uses greater than one, be set to expire when the application is closed on the computing device, or be set to expire after a given time period has elapsed. The token could also be limited via a combination of these methods. For example, the token could be set to expire when the application is closed, or after 10 minutes have elapsed whichever is earlier. A backup time period would be useful in this case, in the event that a third party is able to spoof the payment system into thinking the application never closed. The limited nature of the token will allow the application developer a certain degree of flexibility to provide additional restricted payment system API calls while at the same time preventing unfettered access to the payment system in case the token is somehow obtained through illicit means after it is sent out be server 203. For example, the same token could be used to invoke a first and a second restricted payment system API from the set of restricted payment system APIs using a first and a second tokenized API call. The two tokenized API calls could be conducted in sequence. The two tokenized API calls could be conducted by first isolated code module 204. The two tokenized API calls could each include the token.

The token can be generated using various encryption and hashing methods. For example, the token could be generated by creating a hash of a time at which the token was requested and specific details from the account holder's profile such as the user's login credentials. The hash or other result could then be sent out to the first isolated code module 204 as the token that is delivered to the first isolated code module. The hash or other result could also be stored in a database that is accessible to server 203 in order for the server to validate the token when it is received from the first isolated code module 204. The database could also include a time to live field for the token which would be decremented every time the token was validated. For example, the database could store a value of 2 in the time to live field along with the token in order to allow the application developer to call a restricted payment system API from the set of restricted payment system APIs twice. The time to live value can be set independently for specific restricted payment system APIs. For example, the time to live field for the "check balance" restricted API could be set to infinity while the "send money" time to live field was set to one. As a result, the token could be used an unlimited amount of times to check the balance of a user's account but could only be used to conduct a payment transaction once.

Data line 213 represents a response to the restricted API call of data line 212. Data line 214 represents a presentation of information from that response to user 201. Specific examples of these transfers will be described below with reference to FIGS. 5 and 6. However, the involved information can be any data provided by the restricted API calls offered by the payment system. In the basic example, of a purchase API call the response to the restricted API call in data line 212 could be a transaction status response to indicate whether the transaction request was approved or failed. In another example, the tokenized API could be a wallet inquiry API call which requests a list of payment methods associated with a user's account with the payment system, and the response could include a list of those payment methods which would then be displayed in the application interface to user 201 using first isolated code module 204 and data line 214. In another example, the tokenized API call could be a balance inquiry, and the response could be an account balance which would then be displayed in the application interface to user 201 using first isolated code module 204 and data line 214.

The following code snippets provide examples of how the functions described with reference to FIG. 2 can be encoded. These examples are provided for an implementation in iOS 7. However, these examples are non-limiting and are not meant to limit the applicability of the improvements described herein to any particular programming language or code base. It may be understood that in other embodiments, this is may be implemented through a webpage, web browser, or online. The following code snippet indicates how to call the login API in accordance with data line 210. In this example, the credentials that are provided are a user's phone number and PIN as provided via their computing device along data line 209. In this example, the data is being sent from the PaymentSystemLibrary class that was used in the code snippet example that was included in the previous section:

```
LoginRequest*loginRequest=[[LoginRequest alloc] init];
NSArray*loginTextFieldValuesArray=[NSArray arrayWithObjects:self.mobileNumberTextField.text, self.pinTextField.text, nil];
loginRequest.responseDelegate=self;
[loginRequest sendRequestToCallLoginService:loginTextFieldValuesArray withDelegate:self];
```

The following code snippet indicates how to call the login API with request parameters:

```
self.phoneNumber=[loginTextFieldValues objectAtIndex:0];
self.pin=[loginTextFieldValues objectAtIndex:1];
self.countryCode=[NSString stringWithFormat:@"1"];
NSString*loginUrl=[NSString stringWithFormat:@"http://SAMPLE msb/rest/profile/v1/login"];
NSMutableDictionary*phoneNumberDict=[NSMutableDictionary dictionary];
[phoneNumberDict setObject:self.countryCode forKey:@"countryCode"];
[phoneNumberDict setObject:self.phoneNumber forKey:@"phoneNumber"];
NSMutableDictionary*paramDict=[NSMutableDictionary dictionaryWithObjectsAndKeys: phoneNumberDict, @"phoneNumber", self.pin, @ "pin", nil];
NSString*jsonStr=[JsonWrapper writeJson:paramDict error:nil];
NSDictionary*requestInfo=[NSDictionary dictionaryWithObjectsAndKeys:loginUrl, @"urlString", jsonStr, @"payLoadStr", nil];
[self setResponseDelegate: delegate];
NSMutableURLRequest*request=[RequestBuilder buildRequestToPostWithParamDict:requestInfo];
[self executeWithDelegate:self withRequest:request withServiceId:@"1"];
```

The following code snippet is an example of a tokenized restricted API call along data line 212. In this example, the first isolated code module 204 is calling a "Bill Pay" restricted API:

```
BillPayPaymentService*billPayPaymentService=[[BillPayPaymentService alloc] init];
billPayPaymentService.responseDelegate=self;
[billPayPaymentService sendRequestToBillPayPaymentService:billPayPaymentValuesDict withResponseDelegate:self];
```

The following code snippet is an example of capturing user credentials in the form of a phone number and personal identification number, calling a login API with these two values, and capturing the token in response to the login API call. The italicized text is a placeholder for the URL of the payment platform's login API.

```
self.phoneNumber=[loginTextFieldValues objectAtIndex:0];
self.pin=[loginTextFieldValues objectAtIndex:1];
self.countryCode=[NSString stringWithFormat:@"1"];
NSString*loginUrl=[NSString stringWithFormat:@"http://LOGIN API URL"];
NSMutableDictionary*phoneNumberDict=[NSMutableDictionary dictionary];
[phoneNumberDict setObject:self.countryCode forKey:@"countryCode"];
[phoneNumberDict setObject:self.phoneNumber forKey:@"phoneNumber"];
NSMutableDictionary*paramDict=[NSMutableDictionary dictionaryWithObjectsAndKeys: phoneNumberDict, @"phoneNumber", self.pin, @"pin", nil];
NSString*jsonStr=[JsonWrapper writeJson:paramDict error:nil];
```

```
NSDictionary*requestInfo=[NSDictionary dictionary-
   WithObjectsAndKeys:loginUrl, @"urlString", jsonStr,
   @"payLoadStr", nil];
[self setResponseDelegate: delegate];
NSMutableURLRequest*request=[RequestBuilder buil-
   dRequestToPostWithParamDict:requestInfo];
[self executeWithDelegate:self withRequest:request with-
   ServiceId:@"1"];
```

Example Compilation System and Procedure

The flexibility and security provided via the specific delegation of tasks between the first and second isolated code modules described with reference to FIG. 2 is facilitated by the development, compilation, and distribution system and procedure 300 illustrated by FIG. 3. Procedure 300 illustrates the actions of payment system developer 301, application developer 302, and user 303 working in combination to provide an application 202 with access to a set of at least two restricted payment system APIs offered via payment system server 203.

Payment system developer 301 produces a human readable coded text file 304 that encodes the functionality of second isolated code module 205 in application 202. The human readable coded text file 304 will is used to generate the payment system library file that is used to allow the application 202 to integrate with the payment system. After the human readable coded text file 304 is generated be payment system developer 301, it is compiled and obfuscated to become an obfuscated compiled library file 305. The obfuscation process is intended to be irreversible such that file 305 cannot be decompiled by any compiler besides the one that was utilized to compile it. The library file 305 can be uploaded to a network accessible database 306 so that it can be downloaded by developers that intend to incorporate the payment system into their applications. Since the payment system benefits from the wide adoption of their platform, database 306 can be made accessible publically on the Internet to anyone that is interested in accessing it. Library file 305 is therefore widely available even though it contains information that would provide unscrupulous parties with a window into the inner workings of the payment system. As such, it is important for the compilation and obfuscation procedure to be conducted on a protected system such that no one is able to decompile the library file and reverse engineer its operation.

Application developer 302 also produces a human readable coded text file 307 that encodes the functionality of the application they are developing minus the payment system functionality that will be provided by the library file 305. In order to include the payment system functionality into their application, the application developer 302 will download the library file 305 from a database and integrate it with their application using, for example, the code snippets and methods described above in the prior sections. In a more secure implementation, library file 305 will only be provided to application developers through a secure FTP once they have registered as a developer with the payment system. In an even more secure implementation, the library file is only provided via a hard disk shipped to developer 302 using a physical postal service. Application developer 302 will accomplish integration of the library file with their application via the incorporation of function calls and library instantiations as instructed by the payment system developer through manuals delivered alongside library file 305 or an SDK provided by the payment system, or information made available on a developer portal provided by the payment system. Once the application developer has generated the human readable code file 307, the human readable code file 307 and compiled obfuscated library file 305 can be combined through a compilation procedure into a single application 202.

The format for the human readable text files and library files are limited only by the compatibility of the compilers used to generate application 202 and the library file itself. In a particular example, both human readable text files 307 and 304 will be written in Java, program 202 will be a compiled Java file, and the obfuscated compiled library file or payment system library file 305 can be a JAR or AAR file stored on a database. Program 202 could be developed using Eclipse. In another example, program 202 will be an .A file developed using, for example, Xcode and the human readable text files will be written in objective-C or Swift. Regardless of the format, the functional content of first isolated code module 204 is equal to a functional content of the human readable coded text file 307, and the functional content of the second isolated code module 205 is equal to a functional content of the obfuscated compiled library file 305. Notably, the token that is used for the tokenized restricted API calls discuss previously is not included in either the human readable coded text file 307 or the obfuscated compiled library file 305 prior to the step in which the two files are compiled into a single application. The token is only provided from server 203 in exchange for validly received and authorized credentials from a user 303 operating a device with application 202 installed.

Figure 3:
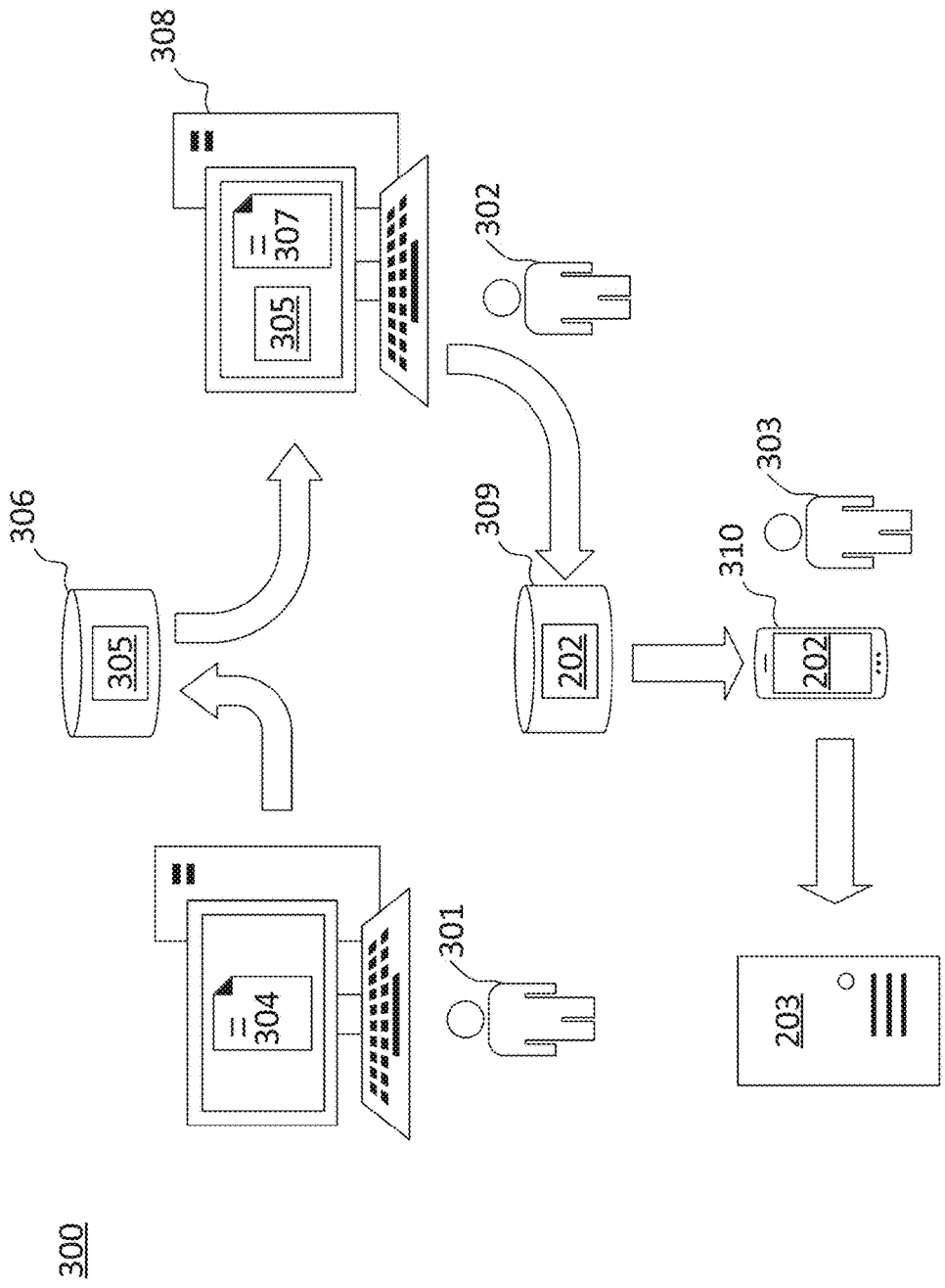
FIG. 3 illustrates a process flowchart for a development, compilation, and distribution system and procedure that is in accordance with embodiments of the present disclosure.

Application 202 can be compiled on a workstation operated by the application developer such as workstation 308 in FIG. 3. Alternatively, the application can be compiled through the use of a cloud-based service in which case developer 302 will submit the filed to a server to be compiled. In a particular example, the cloud-based service will be a cloud-based application store with an integrated compilation functionality. As mentioned previously, the obfuscated compiled library file 305 and human readable coded text file 307 can be stored on a nontransitory computer readable medium. As illustrated, that nontransitory computer readable medium may be the disk of workstation 308. The human readable coded text file 307 can comprise instructions to call a function in the obfuscated compiled library when user 303 selects a payment method in application 202. Human readable coded text file 307 can also comprises instructions to receive a token from a payment system login API and instructions to call a restricted payment system API using the token. Obfuscated compiled library file 305 can comprises compiled instructions to display a login user interface to user 303 and receive login credentials from the login user interface. Obfuscated compiled library file 305 can also comprise instructions to call the payment system login API using the login credentials. In a particular example, human readable coded text file 307 will contain code for a mobile application developed by application developer 302 and obfuscated compiled library file 305 will be a payment system library file. The compiled file can be uploaded from workstation 307 to a publically accessible database 309. The publically accessible database may be the application file database of an application store that would allow users, such as user 303, to download applications to their computing devices, such as mobile device 310.

Figure 4:
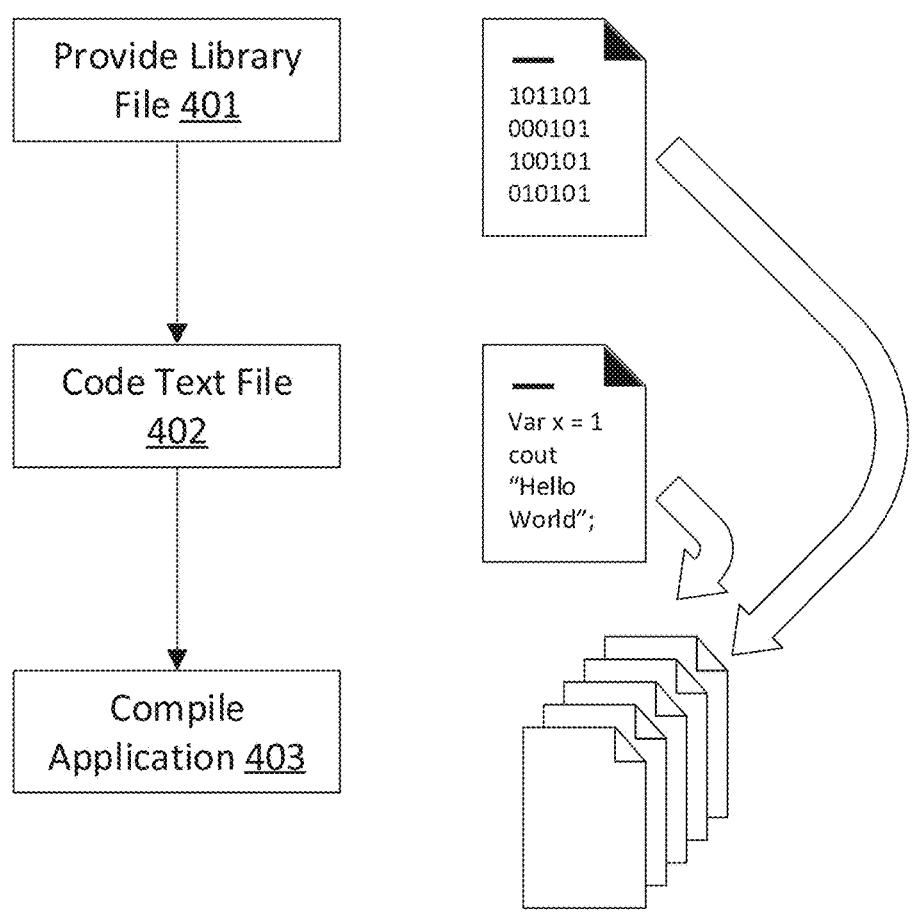
FIG. 4 illustrates a flowchart of a process for compiling a machine code program with a first isolated code module and a second isolated code module that is in accordance with embodiments of the present disclosure.

A process for compiling a machine code program with a first isolated code module and a second isolated code module can be described with reference to flowchart 400 in FIG. 4. Flowchart 400 illustrates a set of methods that can be executed on a workstation such as workstation 308 in FIG. 3. Flowchart 400 begins with step 401 which involves providing an obfuscated compiled library file. The obfuscated compiled library file can be obfuscated compiled library file 305 and can be provided by first downloading it from a public database such as when obfuscated compiled library file 305 is download from public database 306. Flowchart 400 continues with step 402 in which a human readable coded text file is coded through the direction of an application developer. The human readable coded text file can be human readable coded text file 307. Flowchart 400 continues with step 403 in which a machine code program is compiled using a compiler operating on the human readable coded text file from step 402 and the obfuscated compiled library file from step 401. The program can then be uploaded to a public database, such as public database 309, for distribution to computing devices, such as mobile phone 310. The machine coded program can be application 202. Notably, the obfuscated compiled library file 305 cannot be decompiled by the compiler that is used to generate the machine code program in step 403. Therefore, developer 302 can create application 202 but cannot reverse engineer the obfuscated compiled library file 305.

Example Restricted API Call and Application Integration

Figure 5:
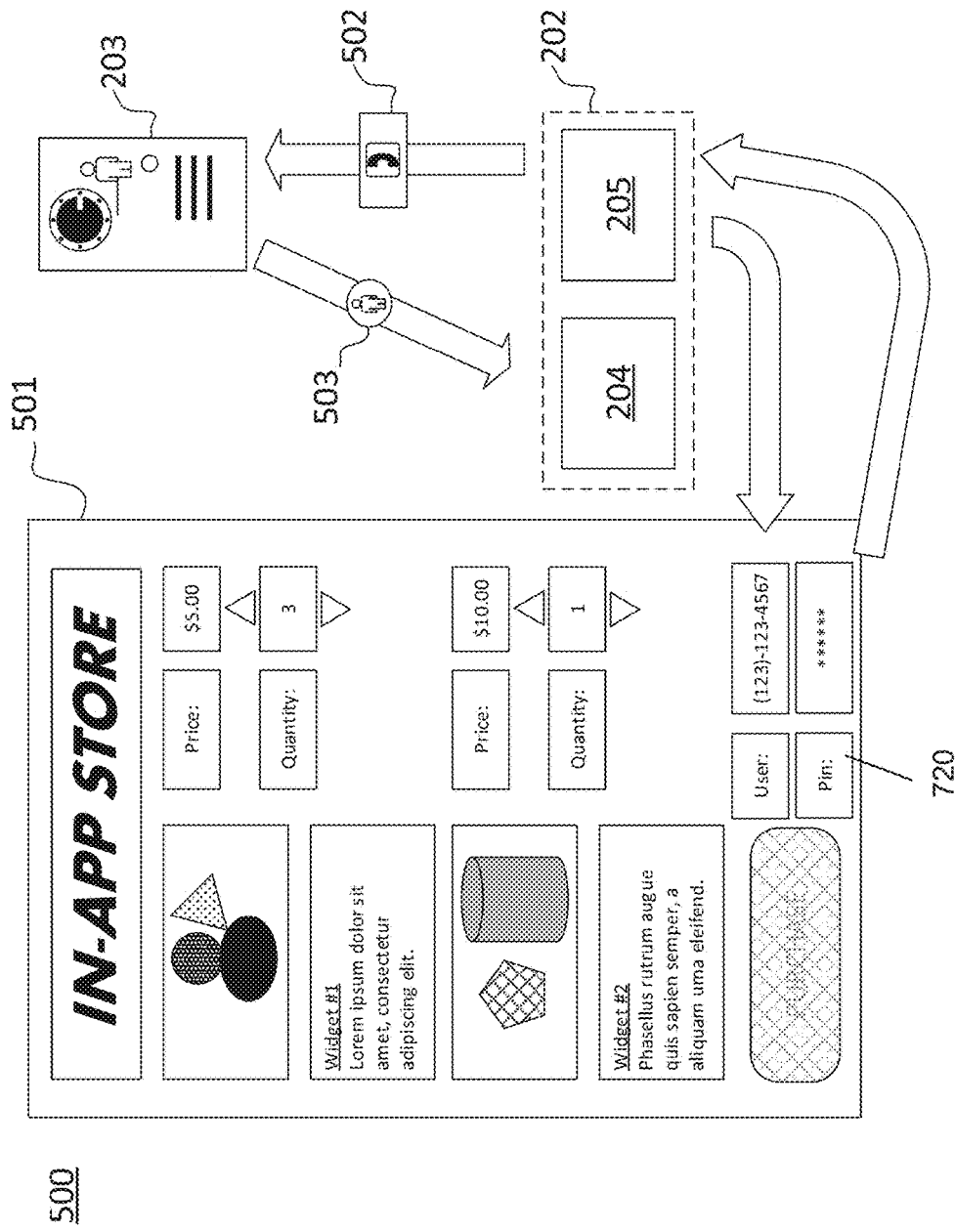
FIG. 5 illustrates a block diagram for an example application login API call by a second isolated code module that is in accordance with embodiments of the present disclosure.
Figure 6:
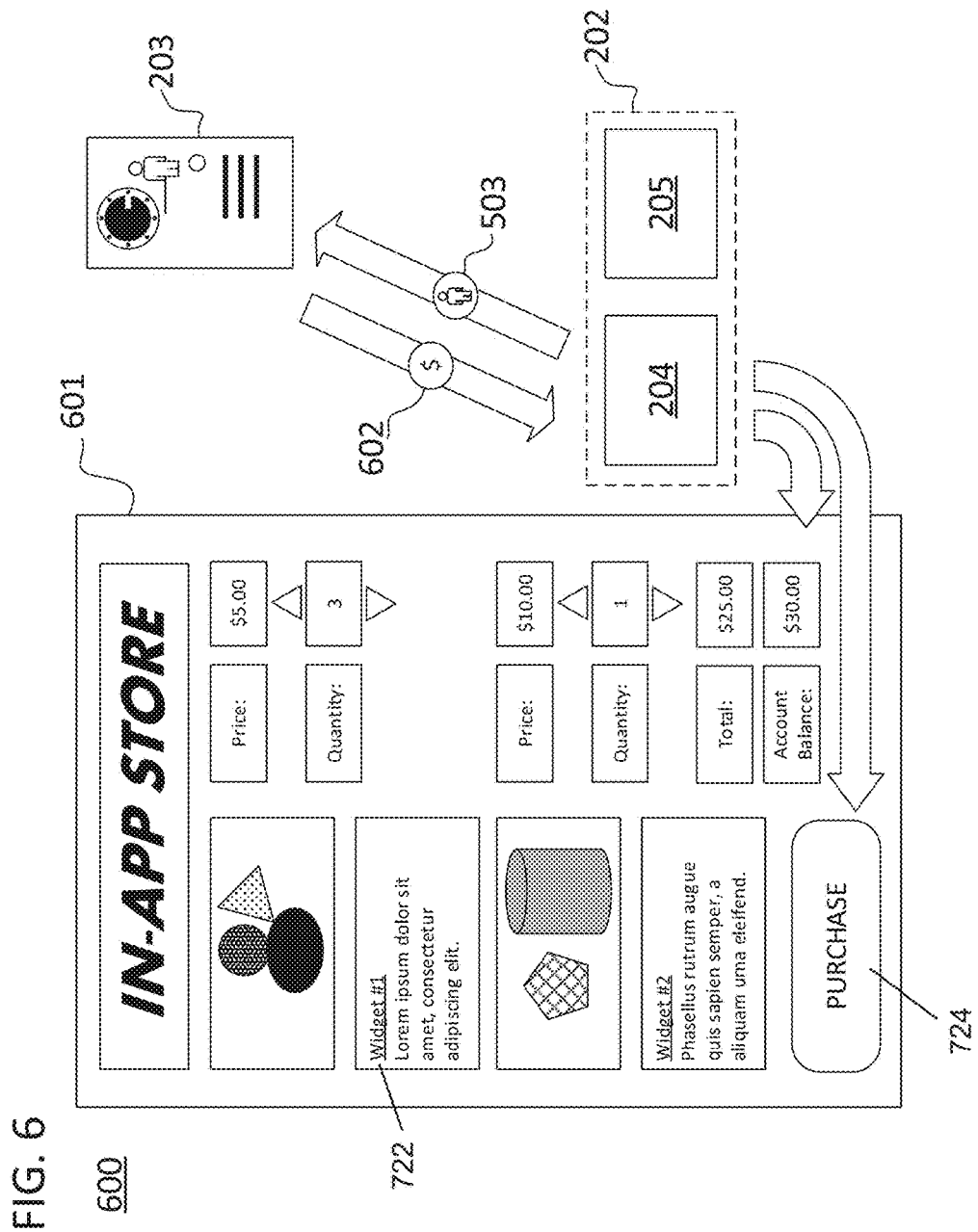
FIG. 6 illustrates a block diagram for an example use of a restricted payment system API call by a first isolated code module that is in accordance with embodiments of the present disclosure.

FIGS. 5 and 6 provide an illustration of an example application that includes the isolated code modules described above and which was generated using the development and compilation process described above. FIG. 5 illustrates block diagram 500 which shows the actual screen 501 generated by the application along with a conceptual diagram of the application space that comprises application 202, first isolated code module 204, second isolated code module 205, and payment system platform server 203.

As illustrated, second isolated code module 205 has generated a login interface for screen 501 and provides that to a screen builder to display the login user interface to a user simultaneously with portions of the screen that are generated by first isolated code module 204. The user will then enter their login credentials to use the payment system with the application. In this case the application is an in-app store for purchasing widgets and the login credentials are a phone number and PIN for the user wherein the phone number serves as the account number of the user's account with the payment system. The login credentials are taken from the user interface and are handled directly by second isolated code module 205 to the exclusion of first isolated code module 204. The login credentials are then passed in as an encrypted packet 502 directly from second isolated code module 205 to payment system platform server 203 via a network. Upon validating the login credentials, token 503 is generated and issued by the payment system platform server 203 and is delivered to the first isolated code module 204. The token can also be stored in a private datastore that is accessible to payment system platform server 203 to check the validity and optionally administrate the use limitations of the token in the future.

FIG. 6 illustrates block diagram 600 which shows the actual screen 601 generated by the application subsequent to the generation of screen 501 along with the same conceptual diagram of FIG. 5. Block diagram 600 is meant to illustrate the utilization of token 503 by first isolated code module 204 to illustrate the flexibility this system provides to an application developer in terms of the restricted API calls they are able to have access to without ever handling login credentials. In this example, token 503 is provided to payment system platform server 203 in a tokenized restricted balance check API call. Upon validating token 503, payment system platform server 203 will provide first isolated code module 204 with a quantum of data 602 indicating a balance user 303 holds with the payment system. First isolated code module 204, as programmed by application developer 302, can then provide that information to the user via the screen 601 to allow the user to check their balance against a current total of the purchase they are considering. The first isolated code module 204 can also use access to these two values to only enable a purchase button when the current total of the purchase the user is considering is available in the user's account. This is a very particular example of the use of the access that first isolated code module 204 is provided to the payment system restricted APIs, and it is intended to illustrate the large numbers of applications and potential additional functionality that an application developer can provide with access to the restricted payment system APIs that the payment system provides access to.

Example Token Use

Methods disclosed herein may be used in the online gaming environment. In the online gaming environment, in order to execute a transaction such as placing a bet or purchasing a commodity, the identity and account of the user is authenticated for each transaction. Typically, a plurality of transactions are performed in a short period of time. For example, in an online gaming service or application, such as a poker game, a slot machine game, or a blackjack game, the user learns of the outcome of the bet very quickly and therefore, over the course of a short duration of time, a plurality of bets are made. In another example, in an online gaming service or application, such as a first-person shooter game, a real-time strategy game, a multiplayer online battle arena game, a massively multiplayer online game, a console game or a browser game, the play is fast-paced but may end if the user runs out of a commodity such as a widget, stamina, firepower or more lives. Therefore, over the course of a short duration of time, a plurality of purchases are made to stay in and to be competitive in the game and to prolong the gaming experience.

When the user is forced stop the game play and input user credentials for every transaction such as a bet, wager or purchase, the momentum of the game and possibly the interest of the user declines. The methods disclosed herein are a secure, safe and convenient way for the user to make transactions in the application or gaming service without stopping game play for a duration of time.

Figure 7:
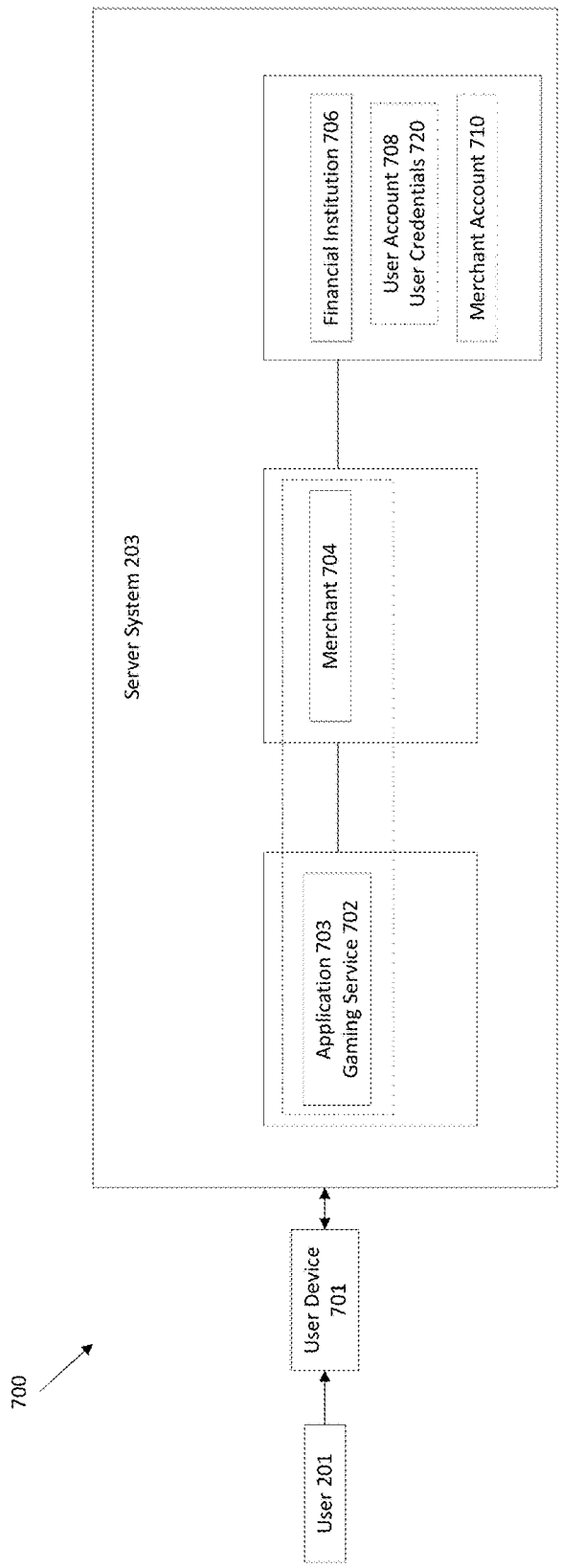
FIG. 7 is a simplified schematic diagram of a payment system environment in accordance with some embodiments.

FIG. 7 is a simplified schematic diagram of a payment system environment in accordance with some embodiments. An example environment 700 for the methods disclosed herein in accordance with some embodiments. The methods (such as for transactions, for online betting, and for providing secure transactions in an application) may be employed in an online gaming environment and operate in the format described in FIG. 2. FIGS. 5 and 6 may also be referenced as example embodiments. In FIG. 7, a user 201 with a user device 701, interacts with and is connected to a server system (e.g., a payment system platform server) 203. The server system 203 is a network of platforms that administers and integrates the system functionality. The server system 203 may include an application 703 or a gaming service 702, a merchant 704, a financial institution 706 which supports a user account 708 and a merchant account 710.

A user device 701, for example, is any communication device including a mobile phone, tablet, smartwatch, laptop or computer which receives inputs from the user 201. The user device 701 is utilized to run an online gaming service 702 or an application 703 that is a software application such as an App, web browser, mobile platform or console game. As used herein, the term application 703 or gaming service 702 generally refers to the person or entity that provides the game. In some embodiments, the application 703 or gaming service 702 is part of the network of platforms of the server system 203. The application 703, gaming service 702 or restricted system APIs may be determined by the developer of the server system 203 and will vary based on what kind of access the developer wants to offer application developers.

The merchant 704 is a business, utility, or other organization that is part of the network of platforms of the server system 203 and associated with providing or supporting the application 703 or gaming service 702. The merchant 704 is authorized to accept transactions through a merchant account 710. The user 201 sets up a user account 708 through the server system 203. This user account 708 may be associated with user credentials 720 such as a user name, a password, a phone or mobile number, social security number, a PIN, a finger print or other verification information that is consistent with know-your-customer (KYC) regulations. The user 201 then registers with the merchant 704 on the server system 203 in order to use the gaming service 702. To register, the user 201 enters the necessary information such as name, enrolled mobile number, address and citizenship in the gaming service.

In some embodiments, a virtual terminal window is displayed on the user device 701 and the user 201 enters user credentials 720 on the user device 701. The enrolled mobile number may serve as the user account number for the user account 708 in the server system 203. In some embodiments, referring to FIG. 5, the user device 701 may display a window prompting the user 201 for the user credentials 720 such as "user" and "PIN". The user 201 inputs the user credentials 720 via the user device 701 and the user device 701 transmits the user credentials 720 to the server system 203. The server system 203 confirms the mobile number and PIN, then returns a success or failure message to the virtual terminal on the user device 701. If successful, the user 201 may now access the application 703 or gaming service 702 via the user device 701.

Figure 8:
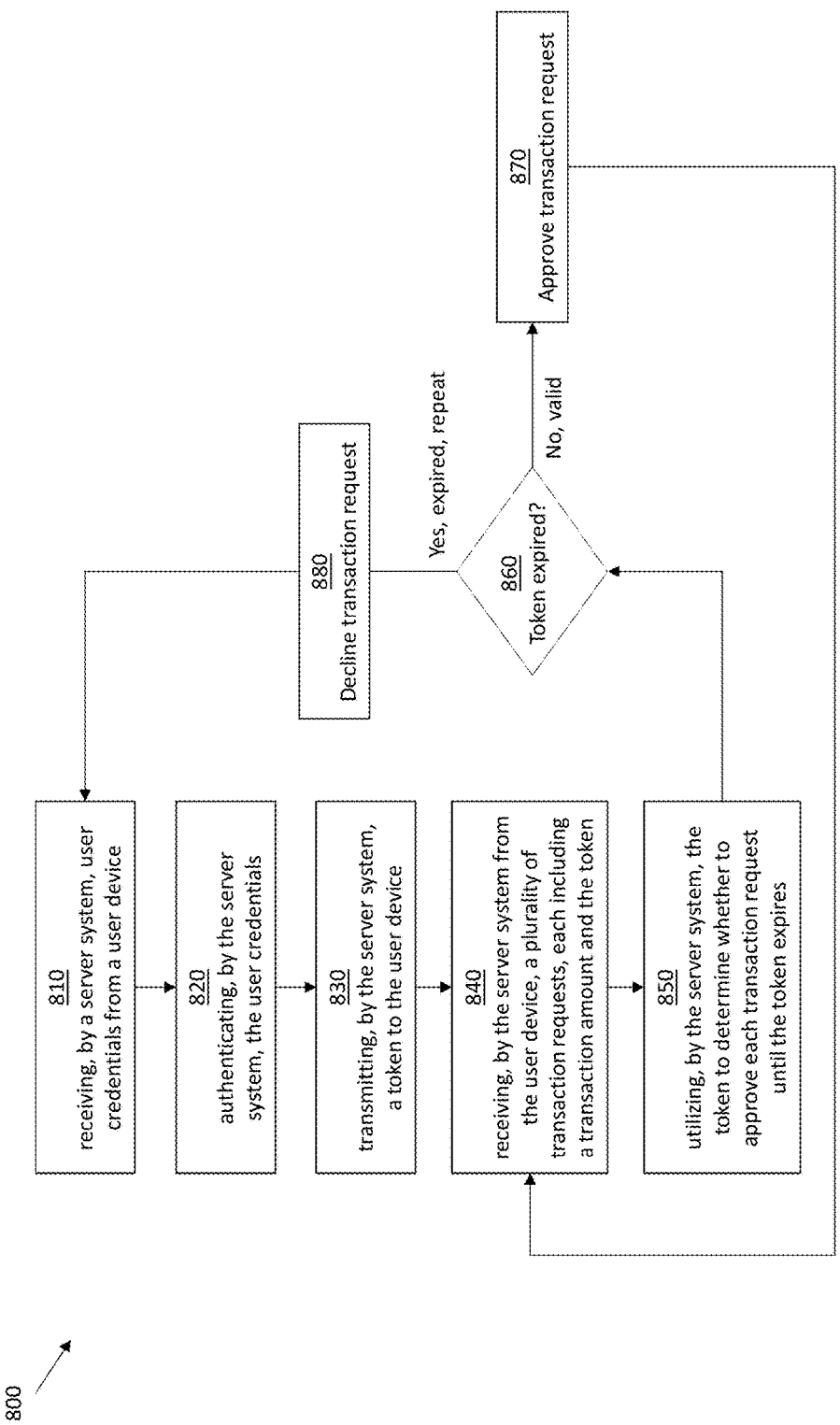
FIG. 8 illustrates a simplified flowchart for a method for transactions in accordance with some embodiments.

FIG. 8 illustrates a simplified flowchart for a method for transactions in accordance with some embodiments. The method for transactions 800 may be used in an online gaming environment. At step 810, the server system 203 receives user credentials 720 from a user device 701. In some embodiments, the user credentials 720 are a unique user identifier or a combination of more than one user identifier, e.g., a user name and a PIN, a password and a PIN, an account number and a PIN, a finger print, etc. In some embodiments, referring to FIG. 5, the user device 701 prompts the user 201 for the user credentials 720 such as "user" and "PIN". The "purchase" icon may be blocked out until the user credentials 720 are authenticated.

At step 820, the user credentials 720 are authenticated by the server system 203. This confirms the identity of the user 201 and ensures that the user's account 708 is registered for gaming. At step 830, a token 503 is transmitted to the user device 701 by the server system 203. The token 503 represents the user credentials 720 and is used in lieu of the user 201 inputting the user credentials 720 on the user device 701 before the token 503 has expired. This is also illustrated in FIG. 5. Referring to FIG. 5, in some embodiments, the server system 203 may include a combination of the first isolated code module 204 and the second isolated code module 205, or the core source code with an obfuscated compiled library file, having payment processing functionality. The segmentation of functionality between these components with regard to the gaming service 702 provide a high degree of isolation and security to any user credentials 720 that may be needed to initiate a transaction.

At step 840, a plurality of transaction requests, each including a transaction amount and the token 503, are received by the server system 203 from the user device 701. In some embodiments, the transaction is a bet, wager or purchase in a gaming environment. Referring to FIG. 6, the user device 701 may display a window prompting the user 201 to purchase commodities in an application 703 or gaming service 702 such as by detailing the commodity as a widget 722. A purchase icon 724 may be selected on the user device 701 by the user 201 to request the transaction.

At step 850, the server system 203 utilizes the token 503 to determine whether to approve each transaction request until the token 503 expires. At step 860, the server system 203 determines if the token 503 is valid or expired. If the token 503 is valid, then at step 870, the transaction request is approved. In accordance with some embodiments, the user account 708 and the merchant account 710 are evaluated with regard to the transaction request to ensure the account is active, sufficient funds are available and any limits set on the account aren't exceeded. The limits may include a single transaction amount or a daily cumulative transaction amount or a total cumulative transaction amount. Risk rules or business rules may also be considered.

If the token 503 is expired, then at step 880, the transaction request is declined. These steps are repeated by returning to step 810 after the token 503 has expired. By returning to step 810 and starting the method again, a valid token 503 may be issued so that the user 201 may continue to participate in the gaming service. At step 860, if the token 503 is valid and the transaction request is approved at step 870, then the method may return to step 840 for another transaction request, such that a plurality of transaction requests are received and processed (at 840-870) before the expiration of the token 503.

The token 503 may expire in a variety of ways or a combination of ways. The expiration of the token 503 may be established by the server system 203 and/or the user 201 or a combination thereof and the unpredictable nature of the expiration provides security features and safe guards for the server system 203 and the user account 708 limiting the exploitation of the user account 708 in case an unauthorized user gains access to the user account 708, managing financial risk and managing activity for the user account 708 and the merchant account 710.

The token 503 expires after one or more of: a period of time has elapsed, a number of transactions have been performed, a cumulative monetary amount of the plurality of transactions has been reached, or the user device 701 exits the server system 203. For example, the token 503 expires after a period of time has elapsed, and in some embodiments, the period of time is 30 minutes, 20 minutes or 10 minutes. The period of time is any suitable amount of time. For example, the user 201 may make a bet via the user device 701, learn the outcome as a winner or loser, and then immediately place another bet. This may be a 'place bet' icon in the gaming service 702 such as a slot machine game that the user 201 clicks on without having to input user credentials 720, then is notified as a win or lose. The user 201 can then click on the 'place bet' icon on the user device 701 for another transaction in a fast-paced, without interruption game until the token 503 expires.

In some embodiments, the period of time for each token 503 received by the user device 701 differs from one another in a random fashion such that one token 503 may expire after 20 minutes, the next token 503 may expire after 30 minutes and the next token 503 may expire after 10 minutes. The random pattern of the period of time that the token 503 expires, or the unpredictable nature of when the token 503 expires, are examples of security measures to limit the exploitation of the user account 708 in case an unauthorized user gains access to the user account 708.

In another example, the token 503 expires after a number of transactions have been performed. The user account 708 may have settings or features set by the server system 203 or the user to allow a maximum predetermined number of transactions, such as bets, wagers or purchases to occur through the user account 708. For example, the maximum predetermined number of transactions may be set at 10. After 10 transactions occur, such as 10 bets, the token 503 expires and the next transaction request will be declined or will restart the process 800 so that the user device 701 must provide the user credentials 720 in order for the transaction request to be approved. This may aid in managing the account during gaming such as for amount of account activity, financial budgeting or amount of time engaged in gaming.

In another example, the token 503 expires after a cumulative monetary amount of the plurality of transactions has been reached. The user account 708 may have settings or features established by the server system 203 or user 201 to allow transactions until a total monetary amount from all bets, wagers or purchases is reached. For example, the user 201 can bet, wager or purchase commodities in the gaming service 702 until a maximum of $100 is spent. This may aid the user 201 in managing the account for factors such as amount of account activity, financial budgeting or amount of time engaged in gaming.

Moreover, the merchant account 710 may have settings or features established by the server system 203 where the token 503 expires after a cumulative monetary amount from the plurality of transactions for all user accounts has been reached. The merchant account 710 may be used to support the gaming service 702 up to cumulative monetary amount for the plurality of transactions for all user accounts, such as $1,000,000. When this maximum is reached, no other transactions requests will be approved because the credit line of the merchant is at the maximum. Consequently, any valid tokens 503 expire.

In another example, the token 503 expires after a duration of inactivity. The user account 708 may have settings or features established by the server system 203 or user 201 to allow the token 503 to expire for lack of participation. This duration may be set by the server system 203 or user 201 and may be, for example, 10 minutes, 15 minutes or 20 minutes. This may encourage the user 201 to make transactions and also limit the exploitation of the user account 708 in case an unauthorized user gains access to the account such as when the user 201 walks away from the user device 701, and the token 503 is otherwise valid.

In another example, the token 503 expires after the user device 701 exits the server system 203. For example, if the user device 701 exits the gaming service 702 on the server system 203 then rejoins, the token 503 is no longer valid. Or, if the user device 701 exits the gaming service 702 on the server system 203 then rejoins a different gaming service, the token 503 is no longer valid. In some embodiments, the user 201 may engage in two different applications 703 with the same token 503. In this mode, the applications 703 may be running on the same device, such as the user device 701, or two different devices such as the user device 701 and the second user device 705. The user 201 may switch between the windows or devices to engage in the gaming environments.

In some embodiments, as an added security feature, although the token 503 may be valid, the user device 701 via the server system 203 may prompt the user 201 to confirm their identity by reentering user credentials 720. This may be random or in response to suspicious activity on the user account 708. For example, if during gaming, a token 503 is issued and the user 201 makes two transactions in 5 minutes, then has a period of 10 minutes of inactivity then makes 7 transactions in 3 minutes, the server system 203 may suspect the user 201 walked away from the user device 701 and an unauthorized user is now using the user account 708.

In some embodiments, when the token 503 to expires may depend on the profile of the user account 708. For example, the user account 708 is associated with a profile which defines a user security level. The different amounts or types of data in the profile provide different levels of certainty that the user is legitimate. The profiles may be categorized in tiers so that the higher tier may be permitted enhanced or more features. Likewise, a lower tier may be permitted fewer benefits. In some scenarios, the user account 708 with the profile in a higher tier may have a longer period of time, be allowed more transactions or have a higher cumulative monetary amount of the plurality of transactions before the token 503 expires compared to the user account 708 with a profile in the lower tier.

The token 503 may expire after one or more of these cases, such as a combination of the factors, and whichever occurs first. For example, the token 503 may be valid for 30 minutes but because the cumulative monetary amount of the plurality of transactions has been reached, for example, $50, the token 503 expires before the 30 minute duration. In another example, the token 503 is valid until a number of transactions have been performed, such as 25 transactions. After the user 201 makes 17 transactions or bets, they exit the gaming service 702 and therefore, upon exit, the token 503 expires.

After the transaction occurs, the method further includes adjusting account balances by the transaction amount for both a user account 708 (associated with the user credentials 720) and a merchant account 710 by the server system 203. For example, if the user 201 is betting in the gaming service using the user device 701, there is a winner and a loser. If the user 201 wins the bet, the transaction amount is immediately, in real-time, credited to the user account 708 in the server system 203 and debited from the merchant account 710 in the server system 203. Conversely, if the user 201 loses the bet, the transaction amount is immediately, in real-time, debited from the user account 708 in the server system 203 and credited to the merchant account 710 in the server system 203.

The user 201 is informed of every transaction associated with the user account 708. In some embodiments, a first user device 701 (such as the user device 701 being used to perform the transactions) associated with the user credentials 720 receives a notification in real-time for each transaction. In other embodiments, a second user device 705 (such as another user device separate from the user device 701 being used to perform the transactions) associated with the user credentials 720 receives a notification in real-time for each transaction. For example, if the user is participating in gaming on a notebook or desktop computer, the notifications can be sent to the user's mobile phone as a separate security check. The notification is transmitted by a SMS text, an email or alert, and includes a date, user account 708, the transaction amount, fees and a transaction ID. The notification sent for the declined transaction also details the reason for the decline such as user account 708 limit exceeded, insufficient funds in the user account 708 or inactive user account 708. Transmitting the notification to a second user device 705, may ensure the user 201 is aware of the activity involving the user account 708 and reduces fraud. The user account 708 may have settings or features so that the notification is transmitted by all methods and therefore receives the notification multiple ways to further ensure the user 201 is informed of the activity involving the user account 708.

Figure 9:
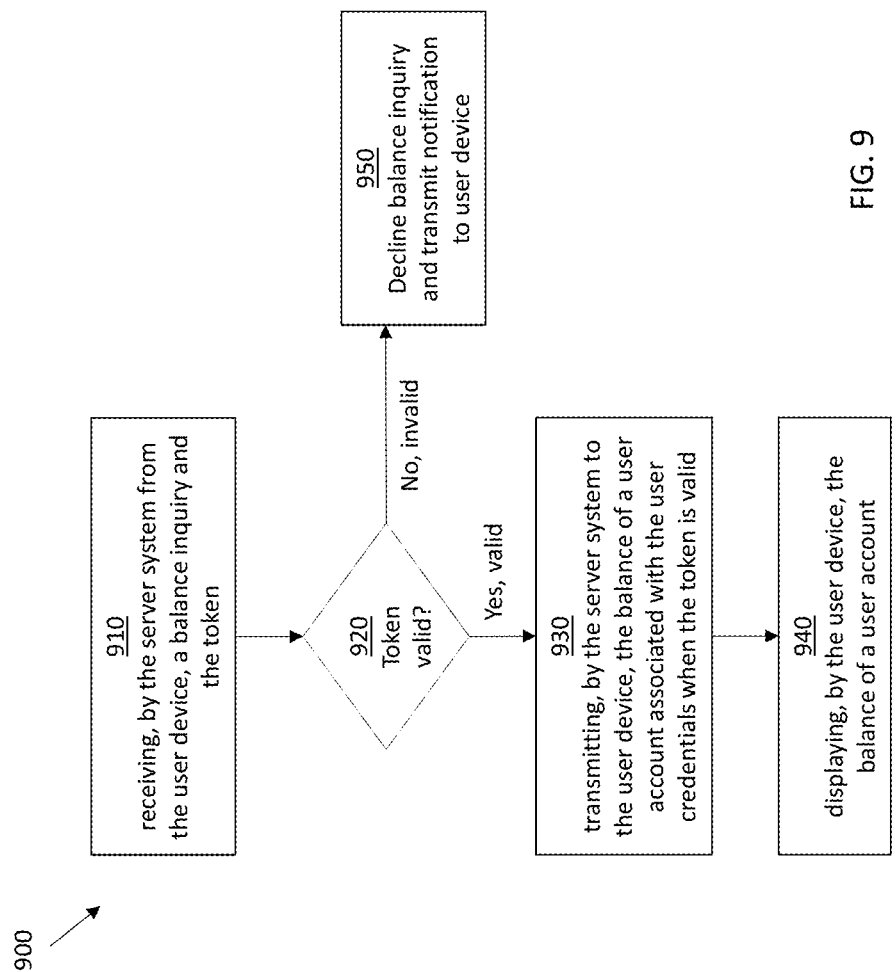
FIG. 9 illustrates a simplified flowchart for a method for balance inquiry in accordance with some embodiments.

In some embodiments, the user device 701 displays a cumulative monetary amount for the plurality of transactions performed during a particular gaming session. This may not necessarily reflect the balance of the user account 708. The method 800 further includes steps to check the balance of the user account 708. FIG. 9 illustrates a simplified flowchart for a method for balance inquiry in accordance with some embodiments. The method for balance inquiry 900 includes at step 910, receiving a balance inquiry and the token 503 from the user device 701 by the server system 203. At step 920, the server system 203 transmits the balance of a user account 708 associated with the user credentials 720 to the user device 701. At step 940, the user device 701 displays the balance of the user account 708. If, however, the token 503 is invalid, at step 950, the balance inquiry is declined and the server system 203 transmits a notification to the user device 701. In some embodiments, a second user device 705 is associated with the user credentials 720 and receives the notification. For example, referring to FIG. 6, the user device 701 may display a window that updates the "account balance" after the balance inquiry.

The server system 203 provides access to a history of transactions for the participants or partners such as the user 201, merchant 704, application 703, gaming service 702, payment system platform server 203 or financial institution 706. For example, the merchant 704, application 703 or gaming service 702 may review the real-time status of the gaming transactions such as complete transactions, transaction summary reports and status messages through a web-based portal. The complete transactions may include the name of the user 201, user account 708, merchant account 710, transaction date, transaction amount and transaction ID. The user 201 may access a transaction history report for their user account 708, including transaction date, transaction amount, transaction ID, merchant name 704 and application 703 or gaming service name 702. The payment system platform server 203 or financial institution 706 may view gaming transactions on transaction reports which include transaction date, transaction amount, transaction ID, user account 708, merchant account 710, user name 201, merchant name 704 and application 703 or gaming service name 702.

Figure 10:
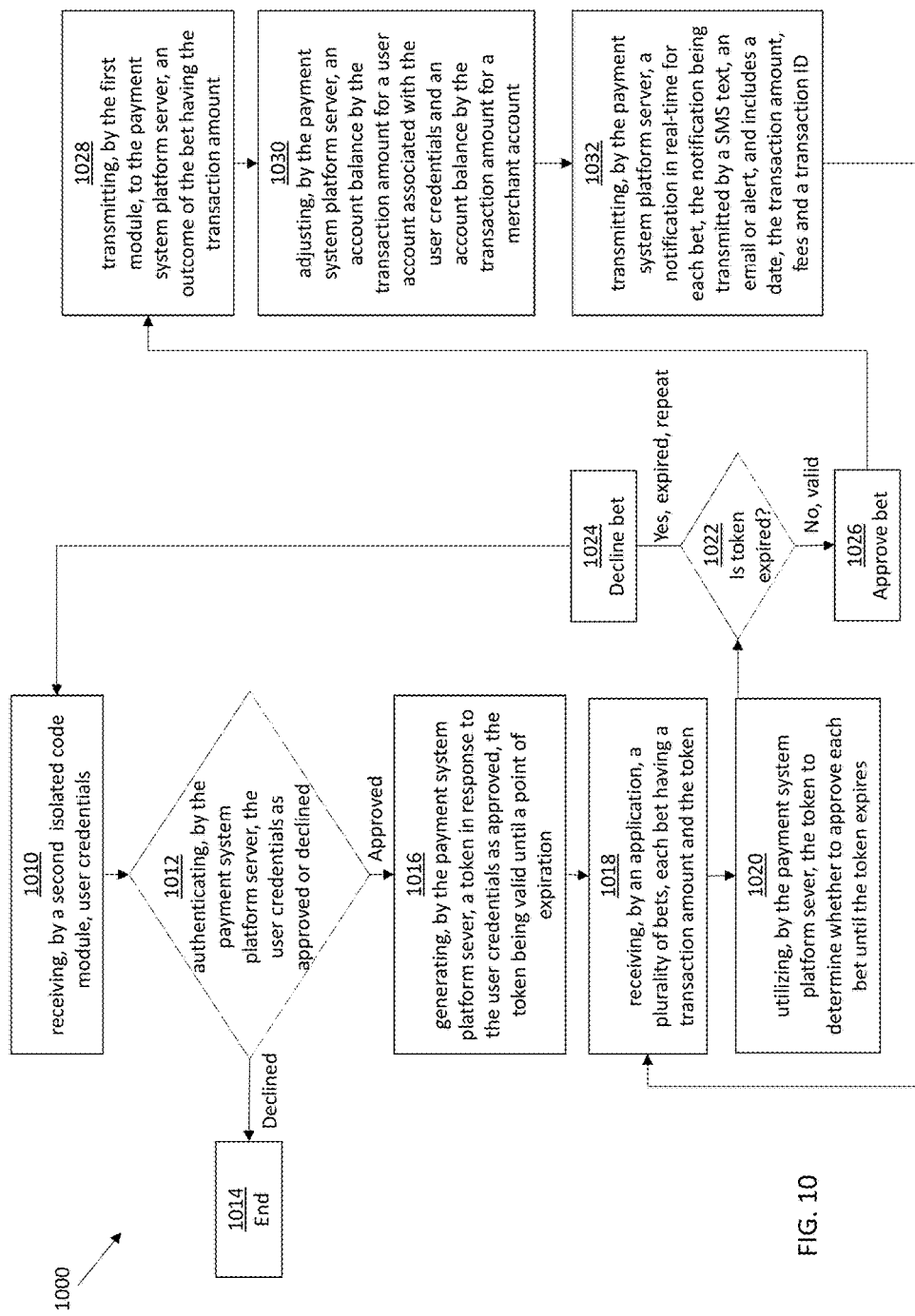
FIG. 10 illustrates a simplified flowchart for a method for online betting in accordance with some embodiments.

FIG. 10 illustrates a simplified flowchart for a method for online betting in accordance with some embodiments. The method for online betting 1000 may be used in an online gaming environment. At step 1010, the user credentials 720 are received by a second isolated code module 205. In some embodiments, the user credentials 720 are a user name and a PIN, a password and a PIN, an account number and a PIN, or a finger print. At step 1012, the user credentials 720 are authenticated as approved or declined by a payment system platform sever. If the user credentials 720 are declined, then at step 1014, the method ends. If the user credentials 720 are approved, then at step 1016, the payment system platform sever issues a token 503 in response to the user credentials 720 as approved. The token 503 is valid until a point of expiration. The token 503 represents the user credentials 720 and is used in lieu of the user 201 inputting user credentials 720 on the user device 701 before the token 503 has expired.

At step 1018, a bet is received by an application. Step 1018 will be repeated for a plurality of bets as explained below. Each bet has a transaction amount and the token 503. At step 1020, the payment system platform sever utilizes the token 503 to determine whether to approve each bet until the token 503 expires. At step 1022, the payment system platform sever determines if the token 503 is valid or expired. If the token 503 is expired, then at step 1024, the bet request is declined and the method may return to step 1010 to generate a new, valid token 503. If the token 503 is valid, then at step 1026, the bet is approved, assuming sufficient funds are available to cover the bet in the user account 708.

At step 1028, an outcome of the bet having the transaction amount is transmitted to the payment system platform server 203 by the application. At step 1030, the payment system platform server 203 adjusts an account balance by the transaction amount for a user account 708 associated with the user credentials 720 and an account balance by the transaction amount for a merchant account 710. At step 1032, a notification in real-time for each bet is transmitted by the payment system platform server. The notification is transmitted by a SMS text, an email or alert, and includes a date, the transaction amount, fees and a transaction ID. The method may return to step 1018 when the next bet is received, therefore repeating for each bet received steps 1018, 1020, 1022, and 1024 or 1026. If step 1026 is repeated, then also repeating steps 1028, 1030 and 1032.

The token 503 expires after one or more of a period of time has elapsed, a number of bets have been performed, a cumulative monetary amount of the plurality of bets has been reached, or the user device 701 exits the application. In some embodiments, the period of time is 30 minutes. In other embodiments, the period of time for each token 503 is any suitable amount of time and differs from one another. These embodiments have been described previously with several examples.

In other embodiments, the method 1000 further includes steps to check the balance of the user account 708 by using the method for balance inquiry 900 as described with reference to FIG. 9. The method for balance inquiry 900 describes using a server system 203. In this embodiment, the server system 203 may specifically be the payment system platform sever. In some embodiments, a second user device 705 is associated with the user credentials 720 and receives the notification.

Figure 11:
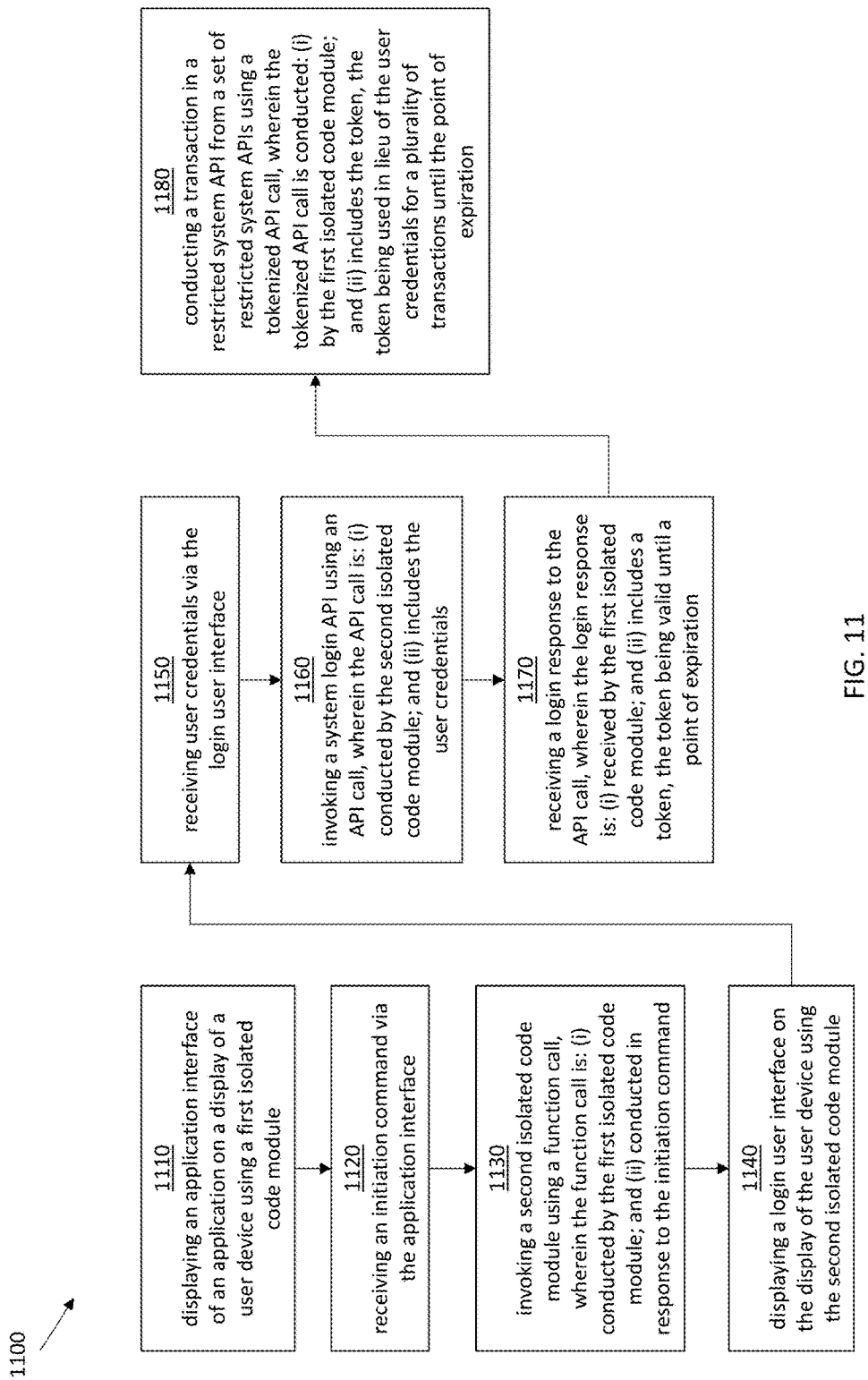
FIG. 11 depicts a simplified flowchart for a method for providing secure transactions in an application in accordance with some embodiments.

FIG. 11 depicts a simplified flowchart for a method for providing secure transactions in an application in accordance with some embodiments. The method for providing secure transactions in an application 1100 may be used in an online gaming environment. At step 1110, an application interface of an application 703 is displayed on a display of a user device 701 using a first isolated code module. At step 1120, an initiation command is received via the application interface. At step 1130, a second isolated code module is invoked using a function call. The function call is conducted by the first isolated code module and conducted in response to the initiation command. At step 1140, a login user interface is displayed on the display of the user device 701 using the second isolated code module. At step 1150, user credentials 720 are received via the login user interface. In some embodiments, the user credentials 720 are a user name and a PIN, a password and a PIN, an account number and a PIN, or a finger print.

At step 1160, a system login API using an API call is invoked. The API call is conducted by the second isolated code module and includes the user credentials 720. At step 1170, a login response to the API call is received. The login response is received by the first isolated code module and includes a token 503. The token 503 is valid until a point of expiration. At step 1180, a transaction is conducted in a restricted system API from a set of restricted system APIs using a tokenized API call. The tokenized API call is conducted by the first isolated code module and includes the token 503. The token 503 is used in lieu of the user credentials 720 for a plurality of transactions until the point of expiration. The transactions may be a bet, wager or purchase. The first isolated code module and the second isolated code module are stored in a single application space on a single memory on the user device 701. The first isolated code module and the second isolated code module are isolated in that the second isolated code module cannot be decompiled by a compiler used to compile the first isolated code module.

The point of expiration occurs after one or more of a period of time has elapsed, a number of transactions have been performed, a cumulative monetary amount of the plurality of transactions has been reached, or the user device 701 exits the restricted system API. These embodiments have been described previously with several examples.

As disclosed, after the transaction occurs, the method further includes adjusting account balances by the transaction amount for both a user account 708 (associated with the user credentials 720) and a merchant account 710 by the server. Moreover, the user 201 is informed of every transaction associated with the user account 708 by notification which is received on the user device 701. In other embodiments, the method 1100 further includes steps to check the balance of the user account 708 by the using the method for balance inquiry 900 as described with reference to FIG. 9. The method for balance inquiry 900 describes using a server system 203. In this embodiment, the server system 203 may specifically be the payment system platform sever. In some embodiments, a second user device 705 is associated with the user credentials 720 and receives the notification.

These embodiments are necessarily rooted in computer technology to address a problem specifically arising in the realm of computer technology, is inextricably tied to computer technology, and is not analogous to a traditional business practice. The present disclosure provides methods of managing and validating the identity of a user for a plurality of transactions in a short period of time securely and easily in an online computer transaction system. The transactions are in a gaming environment, such as online gaming or betting. Typically, when the user is physically located at a gaming site, such as a casino, it is not necessary to validate their identity with each and every bet or wager. The issue of how to securely and conveniently engage in online gaming or betting is a problem created by, and unique to, the computer environment. These methods allow the user in an online gaming environment, who is not physically present at the gaming site, the same luxury of continuous fast-paced transactions, such as placing bets, without having to stop game play to enter, show or authenticate identity credentials for each transaction while maintaining security and ease of use. The problem is unique to the online gaming environment because the user is located remotely while conducting a plurality of transactions using their financial account located remotely. The fact that the token represents the user credentials and can be used for a plurality of transactions or bets offers the user a frictionless way to fully engage in the online gaming environment securely and safely.

In typical gaming applications available in the marketplace, purchasing commodities or betting is a slow, distracting, interrupted, tedious event with a considerable amount of security risk. For example, when the user engaging in the gaming environment such as a slot machine app wants to place a bet, the user stops game play and is diverted to a new window or site to enter, at a minimum, identifying information and a payment method such as credit card credentials—i.e., name, address, credit card number, credit card expiration and credit card PIN. The user then waits for approval. Once approved, the user is returned to the app and the bet is placed. The user is alerted to the outcome of the bet and attempts to place another bet. Again, the user stops game play and is diverted to the new window or site and enters, at a minimum, the same identifying information and a payment method as before and waits for approval. Once approved, the user is returned to the app and the bet is placed. This tedious process is repeated again and again.

Moreover, the user cannot be sure that the new window or site for the payment method is secure and now, the gaming app or a third party may have access to the inputted identifying information and payment method. The continual 'back and forth' activity between the app and the payment system may not be isolated and secure which may alarm and frustrate the user resulting in diminishing interest for engaging in online gaming.

The feature of the token to represent the user credentials in lieu of the user inputting user credentials for each and every transaction while the token is valid speeds up processing the transaction when engaging in online gaming while providing a secure, safe method for processing the transaction. The embodiments of the present disclosure provide a network of platforms that integrate with one another eliminating the need for 'back and forth' activity between functions of the app and payment processing, as found in the prior art. By providing a faster way to process the transaction, such as a bet, based on the token, less computer resources are utilized as well as providing faster payment system authorization processing.

The embodiments of the present disclosure have inherent safety and security aspects provided by the server system. Specifically, the segmentation of functionality between components provide a high degree of isolation and security to any user credentials used in the transactions. The unpredictable nature of the token expiring makes it so an unauthorized person or even an authorized person can't figure out when the token will expire therefore decreasing the chance of exploiting the system. These features protect the user against fraud, theft and exploitation while providing improvements in online gaming, computer technology and payment processing.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the scope of the present invention. Furthermore, those of ordinary skill in the art will appreciate that the foregoing description is by way of example only, and is not intended to limit the invention. Thus, it is intended that the present subject matter covers such modifications and variations.

The invention claimed is:

1. A method comprising:
(a) receiving, by a server system, user credentials from a user device that invokes a system login API using an API call;
(b) authenticating, by the server system, the user credentials;
(c) transmitting, by the server system, a login response including a token to the user device;
(d) receiving, by the server system from the user device, a plurality of payment transaction requests, each including a payment transaction amount and the token in a restricted system API using a tokenized API call;
(e) utilizing, by the server system in the restricted system API, the token multiple times to determine whether to approve the plurality of payment transaction requests until the token expires; and
(f) repeating from step (a) after the token has expired;
wherein the token represents the user credentials in lieu of the user inputting the user credentials for each and every payment transaction until the token expires.

2. The method of claim 1, wherein the token expires after one or more of:
a period of time has elapsed, a number of payment transactions have been performed, a cumulative monetary amount of the plurality of payment transactions has been reached, or the user device exits the server system.

3. The method of claim 2, wherein the period of time is 30 minutes.

4. The method of claim 2, wherein the period of time for each token is any suitable amount of time and differs from one another.

5. The method of claim 1, wherein the user credentials are a user name and a PIN, a password and a PIN, an account number and a PIN, or a finger print.

6. The method of claim 1, wherein the payment transaction is a bet, wager or purchase in a gaming environment.

7. The method of claim 1, further comprising:
adjusting, by the server system, an account balance by the payment transaction amount for a user account associated with the user credentials and an account balance by the payment transaction amount for a merchant account.

8. The method of claim 1, further comprising:
receiving, by the server system from the user device, a balance inquiry and the token;
validating, by the server system, the token as valid or invalid;
transmitting, by the server system to the user device, the balance of a user account associated with the user credentials when the token is valid; and
displaying, by the user device, the balance of a user account.

9. The method of claim 1, wherein a second user device is associated with the user credentials and receives a notification in real-time for each payment transaction, the notification being transmitted by a SMS text, an email or alert, and includes a date, the payment transaction amount, fees and a payment transaction ID.

10. A method comprising:
(a) receiving, by a second isolated code module on a user device, user credentials;
(b) authenticating, by a payment system platform server, the user credentials as approved or declined;
(c) issuing, by the payment system platform server, a token in response to the user credentials as approved, the token being valid until a point of expiration;
(d) receiving, by an application, a plurality of bets, each bet having a payment transaction amount and the token;
(e) utilizing, by the payment system platform server, the token multiple times to determine whether to approve the plurality of bets until the token expires, wherein the token represents the user credentials in lieu of the user inputting the user credentials for each and every payment transaction until the token expires;
(f) transmitting, by the application, to the payment system platform server, an outcome of the bet having the payment transaction amount;
(g) adjusting, by the payment system platform server, an account balance by the payment transaction amount for a user account associated with the user credentials and an account balance by the payment transaction amount for a merchant account;
(h) transmitting, by the payment system platform server, a notification in real-time for each bet, the notification being transmitted by a SMS text, an email or alert, and includes a date, the payment transaction amount, fees and a payment transaction ID;
(i) repeating from step (d) before the token has expired; and
(j) repeating from step (a) after the token has expired.

11. The method of claim 10, wherein the token expires after one or more of:
a period of time has elapsed, a number of bets have been performed, a cumulative monetary amount of the plurality of bets has been reached, or the user device exits the first module.

12. The method of claim 11, wherein the period of time is 30 minutes.

13. The method of claim 11, wherein the period of time for each token differs from one another.

14. The method of claim 10, wherein the user credentials are a user name and a PIN, a password and a PIN, an account number and a PIN, or a finger print.

15. The method of claim 10, further comprising:
receiving, by the payment system platform server from the user device, a balance inquiry and the token;
validating, by the payment system platform server, the token as valid or invalid; and
transmitting, by the payment system platform server to the user device, the balance of a user account associated with the user credentials when the token is valid; and
displaying, by the user device, the balance of a user account.

16. The method of claim 10, wherein a second user device is associated with the user credentials and receives the notification.

17. A method comprising:
displaying an application interface of an application on a display of a user device using a first isolated code module;
receiving an initiation command via the application interface;
invoking a second isolated code module using a function call, wherein the function call is: (i) conducted by the first isolated code module; and (ii) conducted in response to the initiation command;
displaying a login user interface on the display of the user device using the second isolated code module;
receiving a user credentials via the login user interface;

invoking a system login API using an API call, wherein the API call: (i) is conducted by the second isolated code module; and (ii) includes the user credentials;

receiving a login response to the API call, wherein the login response: (i) is received by the first isolated code module; and (ii) includes a token, the token being valid until a point of expiration; and conducting a plurality of payment transactions in a restricted system API from a set of restricted system APIs using a tokenized API call, wherein the tokenized API call: (i) is conducted by the first isolated code module; and (ii) includes the token, the token being used multiple times in lieu of the user credentials for the plurality of payment transactions until the point of expiration;

wherein the token represents the user credentials in lieu of the user inputting the user credentials for each and every payment transaction until the token expires;

wherein the first isolated code module and the second isolated code module are stored in a single application space on a single memory on the user device; and wherein the first isolated code module and the second isolated code modules are isolated in that the second isolated code module cannot be decompiled by a compiler used to compile the first isolated code module.

18. The method of claim 17, wherein the point of expiration occurs after one or more of:

a period of time has elapsed, a number of payment transactions have been performed, a cumulative monetary amount of the plurality of payment transactions has been reached, or the user device exits the restricted system API.

* * * * *